(12) United States Patent
Cao et al.

(10) Patent No.: US 10,395,179 B2
(45) Date of Patent: Aug. 27, 2019

(54) METHODS AND SYSTEMS OF VENUE INFERENCE FOR SOCIAL MESSAGES

(71) Applicant: FUJI XEROX CO., LTD., Tokyo (JP)

(72) Inventors: Bokai Cao, Chicago, IL (US);
Francine Chen, Menlo Park, CA (US);
Dhjraj Joshi, Fremont, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 902 days.

(21) Appl. No.: 14/664,734

(22) Filed: Mar. 20, 2015

(65) Prior Publication Data

US 2016/0275401 A1 Sep. 22, 2016

(51) Int. Cl.
*G06N 5/02* (2006.01)
*G06N 20/00* (2019.01)
*H04L 12/58* (2006.01)

(52) U.S. Cl.
CPC ............. *G06N 20/00* (2019.01); *H04L 51/32* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 8,200,247 B1 | 6/2012 | Starenky et al. | |
| 8,990,327 B2 | 3/2015 | Drews et al. | |
| 2009/0092322 A1 | 4/2009 | Erol et al. | |
| 2011/0238762 A1 | 9/2011 | Soni et al. | |
| 2012/0033655 A1 | 2/2012 | Tang | |
| 2012/0150819 A1 | 6/2012 | Lindahl et al. | |
| 2013/0041653 A1 | 2/2013 | Tseng | |
| 2015/0046452 A1 | 2/2015 | Agrawal et al. | |
| 2017/0109615 A1 | 4/2017 | Yatziv et al. | |

OTHER PUBLICATIONS

Zhang, et al., Meta-path based Multi-Network Collective Link Prediction, KDD '14, Proceedings of the 20th ACM SIGKDD international conference on Knowledge discovery and data mining, Aug. 24-27, 2014, pp. 1286-1295.*

(Continued)

*Primary Examiner* — Wilbert L Starks
(74) *Attorney, Agent, or Firm* — Morgan, Lewis & Bockius LLP

(57) ABSTRACT

A method for inferring venues from social messages includes: accessing a collection of venues and training a classifier that predicts whether a social message is linked to a venue in the collection of venues; receiving a new social message; for each venue in the collection of venues: identifying for the new social message corresponding meta-paths to the particular venue; encoding the corresponding meta-paths as a feature vector for the trained classifier; computing by the trained classifier a score for each venue in the collection of venues indicating whether the new social message is linked to the venue; and based on the scores, identifying at least one candidate venue as a predicted venue for the new social message and associating the predicted venue with the new social message. In some implementations, the new social message is not geotagged.

20 Claims, 21 Drawing Sheets

(56) References Cited

OTHER PUBLICATIONS

Albakour, et al., Diversifying Contextual Suggestions from Location-based Social Networks, Proceedings of the 5th Information Interaction in Context Symposium, 2014, pp. 125-134 (Year: 2014).*

Lars Backstrom, Eric Sun, and Cameron Marlow. Find me if you can: improving geographical prediction with social and spatial proximity. In WWW, pp. 61-70. ACM, 2010.

Bokai Cao, Xiangnan Kong, and Philip S Yu. Collective prediction of multiple types of links in heterogeneous information networks. In ICDM. IEEE, 2014.

Francine Chen, Dhiraj Joshi, Yasuhide Miura, and Tomoko Ohkuma. Social media-based profiling of business locations. In GeoMM. ACM, 2014.

Zhiyuan Cheng, James Caverlee, and Kyumin Lee. You are where you tweet: a content-based approach to geo-locating Twitter users. In CIKM, pp. 759-768. ACM, 2010.

Eunjoon Cho, Seth A Myers, and Jure Leskovec. Friendship and mobility: user movement in location-based social networks. In KDD, pp. 1082 1090. ACM, 2011.

Clodoveu A Davis Jr, Gisele L Pappa, Diogo Renno Rocha de Oliveira, and Filipe de L Arcanjo. Inferring the location of Twitter messages based on user relationships. Transactions in GIS, 15(6):735 751, 2011.

Jacob Eisenstein, Brendan O'Connor, Noah A Smith, and Eric P Xing. A latent variable model for geographic lexical variation. In EMNLP, pp. 1277 1287. ACL, 2010.

Bo Han, Paul Cook, and Timothy Baldwin. Text-based Twitter user geolocation prediction. Journal of Artificial Intelligence Research, 49:451 500, 2014.

Brent Hecht, Lichan Hong, Bongwon Suh, and Ed H Chi. Tweets from Justin Bieber's heart: the dynamics of the location field in user profiles. In CHI, pp. 237 246, ACM, 2011.

Liangjie Hong, Amr Ahmed, Siva Gurumurthy, Alexander J Smola, and Kostas Tsioutsiouliklis. Discovering geographical topics in the Twitter stream. In WWW, pp. 769-778. ACM, 2012.

Yohei Ikawa, Miki Enoki, and Michiaki Tatsubori. Location inference using microblog messages. In WWW{Companion), pp. 687690. ACM, 2012.

Dmytro Karamshuk, Anastasios Noulas, Salvatore Scellato, Vincenzo Nicosia, and Cecilia Mascolo. Ceo-spotting: mining online location-based services for optimal retail store placement. In KDD, pp. 793-801. ACM, 2013.

Sheila Kinsella, Vanessa Murdock, and Neil O'Hare. I'm eating a sandwich in Glasgow: modeling locations with tweets. In SMUG, pp. 61 68. ACM, 2011.

Xiangnan Kong, Bokai Cao, and Philip S Yu. Multi-label classification by mining label and instance correlations from heterogeneous information networks. In KDD, pp. 614 622. ACM, 2013.

Chenliang Li and Aixin Sun. Fine-grained location extraction from tweets with temporal awareness. In SIGIR, pp. 43-52. ACM, 2014.

Wen Li, Pavel Serdyukov, Arjen P de Vries, Carsten Eickhoff, and Martha Larson. The where in the tweet. In CIKM, pp. 2473-2476. ACM, 2011.

Nan Lin. Social networks and status attainment. Annual review of sociology, pp. 467-487, 1999.

Jalal Mahmud, Jeffrey Nichols, and Clemens Drews. Where is this tweet from? Inferring home locations of Twitter users. In ICWSM, 2012.

Miller McPherson, Lynn Smith-Lovin, and James M Cook. Birds of a feather: Homophily in social networks. Annual review of sociology, pp. 415-444, 2001.

Adam Sadilek, Henry Kautz, and Jeffrey P Bigham. Finding your friends and following them to where you are. In WSDM, pp. 723 732. ACM, 2012.

Adam Sadilek, Henry A Kautz, and Vincent Silenzio. Predicting disease transmission from geo-tagged micro-blog data. In AAAI, 2012.

Takeshi Sakaki, Makoto Okazaki, and Yutaka Matsuo. Earthquake shakes Twitter users: real-time event detection by social sensors. In WWW, pp. 851 860, ACM, 2010.

Yizhou Sun, Jiawei Han, Xifeng Yan, Philip S Yu, and Tianyi Wu. Pathsim: Meta path-based top-k similarity search in heterogeneous information networks. In VLDB, 2011.

Yizhou Sun, Brandon Norick, Jiawei Han, Xifeng Yan, Philip S Yu, and Xiao Yu. Integrating meta-path selection with user-guided object clustering in heterogeneous information networks. In KDD, pp. 1348-1356. ACM, 2012.

Xia Wang, Ming Xu, Yizhi Ren, Jian Xu, Haiping Zhang, and Ning Zheng. A location inferring model based on tweets and bilateral follow friends. Journal of Computers, 9(2):315 321, 2014.

Benjamin P Wing and Jason Baldridge. Simple supervised document geolocation with geodesic grids. In ACL, pp. 955-964. Association for Computational Linguistics, 2011.

Jiawei Zhang, Xiangnan Kong, and Philip S Yu. Transferring heterogeneous links across location-based social networks. In WSDM, pp. 303 312. ACM, 2014.

Al Hasan, Dept. of Computer and Information Science Indiana Univ., A Survey of Link Prediction in Social Networks, 2011, 33 pgs.

Flatow, On the Accuracy of Hyper-Local Geotagging of Social Media Content, Feb. 2-6, 2015, 10 pgs.

Li, Fine-Grained Location Extraction from Tweets with Temporal Awareness, Jul. 6-11, 2014, 10 pgs.

Liben-Nowell, The Link-Prediction Problem for Social Networks, Wiley InterScience Discover Something Great, Dept. of Computer Science, Carleton College, Aug. 25, 2006, 13 pgs.

Rakesh, Location-Specific Tweet Detection and Topic Summarization in Twitter, 2013 IEEE/ACM International Conf. on Advances in Social Networks Analysis and Mining, Aug. 25-28, 2013, 4 pgs.

Zhang, Meta-path based Multi-Network Collective Link Prediction, Aug. 24-27, 2014, 10 pgs.

De Couto, D.S., & Morris, R. (2001). Location proxies and intermediate node forwarding for practical geographic forwarding (Year: 2001).

Rao, A., Ratnasamy, S., Papadimitriou, C., Shenker, S., & Stoica, I. (Sep. 2003). Geographic routing without location information. In Proceedings of the 9th annual international conference on Mobile computing and networking (pp. 96-108). ACM. ( Year: 2003).

* cited by examiner

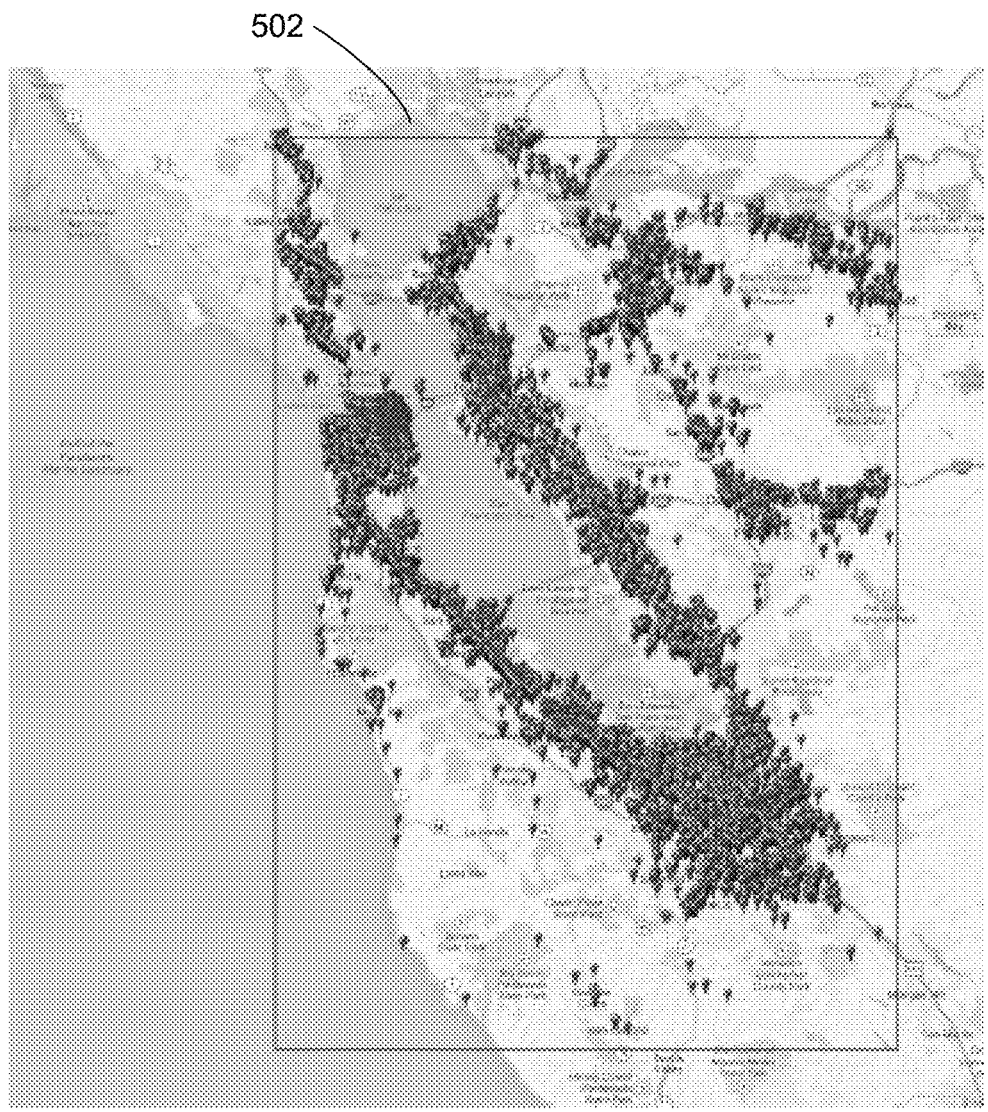
Figure 5 Spatial distribution of verified venues in the San Francisco Bay Area, collected from Foursquare. The frame indicates the bounding box.

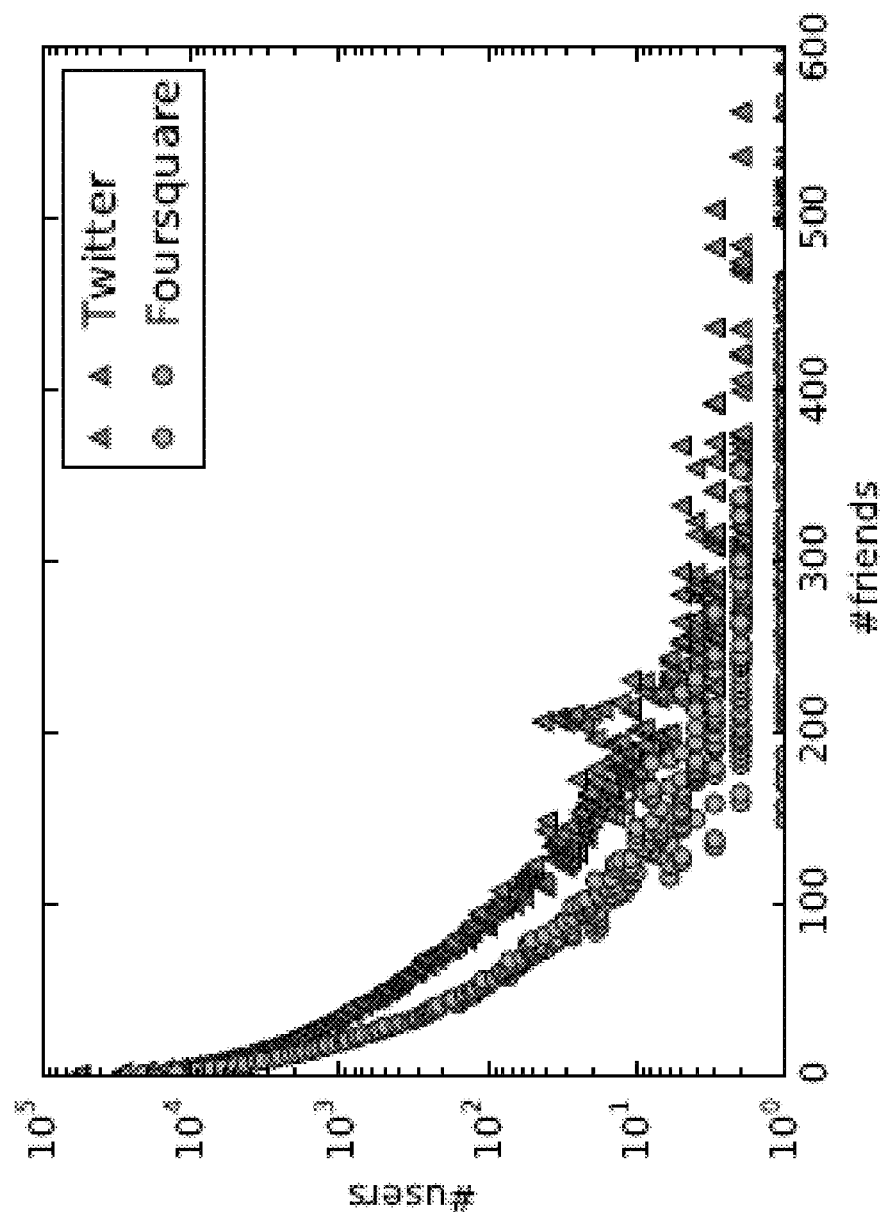
Figure 6: Distribution of the number of users with a given number of friends in Twitter and Foursquare.

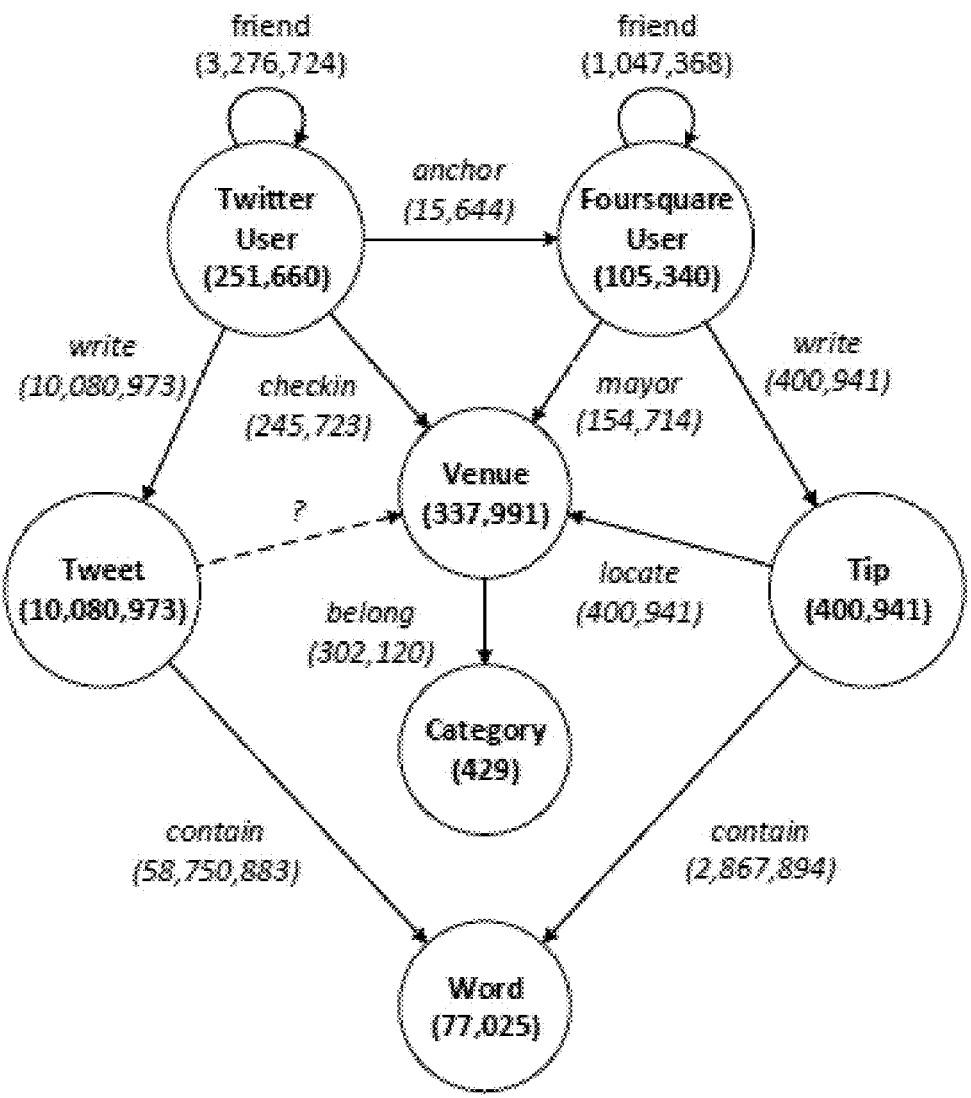
Figure 7: The network schema of our combined Twitter and Foursquare data. Each circle represents a type of node in the network, and each line represents a type of link. Each number under the node/link represents the total number of nodes/links of the corresponding type in the social network.

Examples of meta-paths used in our method.

| Types | Meta-paths |
|---|---|
| ECOPATH | tweet $\xrightarrow{write^{-1}}$ Twitter user $\xrightarrow{checkin}$ venue |
| | tweet $\xrightarrow{write^{-1}}$ Twitter user $\xrightarrow{anchor}$ Foursquare user $\xrightarrow{mayor}$ venue |
| | tweet $\xrightarrow{write^{-1}}$ Twitter user $\xrightarrow{anchor}$ Foursquare user $\xrightarrow{write}$ tip $\xrightarrow{locate}$ venue |
| FRIENDPATH | tweet $\xrightarrow{write^{-1}}$ Twitter user $\xrightarrow{friend}$ Twitter user $\xrightarrow{checkin}$ venue |
| | tweet $\xrightarrow{write^{-1}}$ Twitter user $\xrightarrow{friend}$ Twitter user $\xrightarrow{anchor}$ Foursquare user $\xrightarrow{mayor}$ venue |
| | tweet $\xrightarrow{write^{-1}}$ Twitter user $\xrightarrow{anchor}$ Foursquare user $\xrightarrow{friend}$ Foursquare user $\xrightarrow{mayor}$ venue |
| | tweet $\xrightarrow{write^{-1}}$ Twitter user $\xrightarrow{anchor}$ Foursquare user $\xrightarrow{friend}$ Foursquare user $\xrightarrow{write}$ tip $\xrightarrow{locate}$ venue |
| | tweet $\xrightarrow{write^{-1}}$ Twitter user $\xrightarrow{anchor}$ Foursquare user $\xrightarrow{friend}$ Foursquare user $\xrightarrow{write}$ tip $\xrightarrow{locate}$ venue |
| INTERESTPATH | tweet $\xrightarrow{write^{-1}}$ Twitter user $\xrightarrow{checkin}$ venue $\xrightarrow{belong}$ category $\xrightarrow{belong^{-1}}$ venue |
| | tweet $\xrightarrow{write^{-1}}$ Twitter user $\xrightarrow{anchor}$ Foursquare user $\xrightarrow{mayor}$ venue $\xrightarrow{belong}$ category $\xrightarrow{belong^{-1}}$ venue |
| | tweet $\xrightarrow{write^{-1}}$ Twitter user $\xrightarrow{anchor}$ Foursquare user $\xrightarrow{write}$ tip $\xrightarrow{locate}$ venue $\xrightarrow{belong}$ category $\xrightarrow{belong^{-1}}$ venue |
| TEXTPATH | tweet $\xrightarrow{contain}$ word $\xrightarrow{contain^{-1}}$ tip $\xrightarrow{locate}$ venue |

FIG. 8

| | Ego Path Count 902 | Friend Path Count 904 | Interest Path Count 906 | Text Path Count 908 | Ego Geo 910 | Friend Geo 912 | |
|---|---|---|---|---|---|---|---|
| tweet 918372 venue 1038 | [ 5. | 0. | 12. | 3. | 20.72326584 | 8.72692089] | ← Feature Vector 901-1 |
| tweet 66589 venue 5387 | [ 0. | 2. | 0. | 1. | 5.51803083 | 4.11826654] | ← Feature Vector 901-2 |
| ... | ... | | | | | | ← Feature Vector 901-3 |
| tweet 102928 venue 992 | [ 1. | 0. | 3. | 1. | 8.43745361 | 4.65029298] | ← Feature Vector 901-4 |
| tweet 772987 venue 291 | [ 0. | 0. | 0. | 0. | 0.278958094 | 4.09643538] | ← Feature Vector 901-5 |
| tweet 58294 venue 3219 | [ 0. | 0. | 0. | 1. | 2.07541817 | 4.93630349] | |
| ... | ... | | | | | | |
| tweet 19883 venue 10946 | [ 0. | 0. | 1. | 2. | 9.45201711 | 7.31271901] | ← Feature Vector 901-6 |

[ 1
  1
  ...
  0
  0
  ...
  0 ]

Label Vector 920

FIG. 9

Figure 11: Spatial distribution of verified venues in the Stanford Shopping Center, collected from Foursquare.

Figure 12: Spatial distribution of Starbucks (blue pins), McDonald's (green pins), and Apple Stores (red pins) in the San Francisco Bay Area. Some stores are not visible because of overlapping marks.

Figure 13: Performance on using different strategies to enumerate venues.

Figure 14: Performance on inferring geographic venues in the Stanford Shopping Center.

Figure 15: Performance on inferring geographic venues for tweets associated with Starbucks, McDonald's, and Apple Stores.

Performance of different features used in VIT "average ± std".

| Features | Accuracy | Evaluations | | |
|---|---|---|---|---|
| | | Precision | Recall | F1 |
| EcoPath | 0.5412±0.0003 | 0.9953±0.0008 | 0.0825±0.0006 | 0.1525±0.0011 |
| FriendPath | 0.5684±0.0003 | 0.9813±0.0004 | 0.1394±0.0006 | 0.2442±0.0009 |
| InterestPath | 0.5425±0.0003 | 0.8654±0.0019 | 0.1006±0.0004 | 0.1802±0.0006 |
| TextPath | 0.7367±0.0015 | 0.9011±0.0010 | 0.5326±0.0025 | 0.6692±0.0023 |
| Paths | 0.7788±0.0016 | 0.9096±0.0019 | 0.6192±0.0025 | 0.7368±0.0021 |
| EcoGeo | 0.8100±0.0009 | 0.8643±0.0027 | 0.7496±0.0030 | 0.8029±0.0012 |
| FriendGeo | 0.6865±0.0015 | 0.7407±0.0043 | 0.5647±0.0043 | 0.6430±0.0020 |
| Geos | 0.8282±0.0022 | 0.8701±0.0023 | 0.7717±0.0034 | 0.8179±0.0025 |
| V$_{IT}$ | 0.8859±0.0020 | 0.9320±0.0010 | 0.8325±0.0042 | 0.8794±0.0024 |

FIG. 16

For each venue in the collection of venues: — 1726

Encoding the corresponding meta-paths as a feature vector for the trained classifier, wherein each element of the feature vector includes a measure based on a respective type of social message connected to the particular venue — 1736

17D

The measure is an egogeo score for a tweet $t_i$ being posted by user $u_i$ at venue $v_p$ that measures a closest distance between geotagged social messages of a user who posted a non-geotagged message and the respective venue — 1746

The measure is an egogeo score calculated by:

$$\text{EGOGEO}(t_i, v_p) = -\log\left(\min_{t_j \in T_i - t_i} d(t_j, v_p) + \epsilon\right)$$

Ti denotes the set of geotagged social messages posted by ui, d(. , . ) denotes the distance between a geotagged social message and a venue, and ? is added to avoid underflow with default value — 1748

The measure is a friendgeo score that measures a closest distance between geotagged social messages of friends of a user who posted a non-geotagged message and the respective venue — 1750

The measure is a friendgeo score calculated by $$\text{FRIENDGEO}(t_i, v_p) = -\log\left(\min_{t_j \in T_k, u_k \in N_i} d(t_j, v_p) + \epsilon\right)$$

— 1752

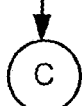

FIGURE 17D

METHODS AND SYSTEMS OF VENUE INFERENCE FOR SOCIAL MESSAGES

TECHNICAL FIELD

The present application generally related to venue inference and more particularly related to identification of venues based on social messages.

BACKGROUND

Social platforms (e.g., Twitter) are popular for sharing activities, thoughts, and opinions. Geotagging of social messages (e.g., tweets) enables applications to personalize a user's experience based on location information. However, due to privacy concerns, only a small percentage of users choose to publicize their location when they post social messages, and others only occasionally reveal the location of some of their social messages.

Inferring location of social messages (e.g., tweets) has emerged to be a critical and interesting issue in social media, since the proportion of geotagged social messages (e.g., tweets) is relatively low and the ones with specific venues associated with them are even sparser. It is a challenging problem due to the sparse usage of geo-enabled features in social media. For example, according to one study, less than 1% of tweets are geotagged. For non-geotagged tweets, the most explicit information that can be used for location inference is the textual content of tweets, which can mix a variety of daily activities (e.g., food, sports, emotions, opinions) without clear location signals. Tweets are usually short and informal, implying that traditional gazetteer terms may not be present in the vocabulary of the tweets at all. Even if proper place names are contained in tweets, it can still be a tough problem, especially for chain stores. For example, there may not be a significant difference between content of tweets that are associated with the Starbucks at Berkeley and the Starbucks at Stanford. Therefore, it is not easy to tell from the content of a tweet which branch store the tweet was posted from.

Inferring the location of non-geotagged social messages (e.g., tweets) can facilitate better understanding of users' geographic context, which can enable better inference of a geographic intent in search queries, more appropriate placement of advertisements, and display of information about events, points of interest, and people in the geographic vicinity of the user. Conventional systems and methods on modeling locations in social networks can be roughly categorized into two groups based on the techniques used for geo-locating: content analysis of social messages (e.g., tweets), and inference via social relations of users. Depending on the objects being predicted, different systems and methods focus on inferring the locations of users or individual social messages (e.g., tweets).

Another inadequacy of conventional systems and methods is that most existing systems and methods infer the location of a user or a social message (e.g., tweet) at a coarse level of granularity, ranging from country, state, to city levels, which may not be good enough to identify potential recipients for location-driven advertising. Thus, identifying the location of a social message (e.g., tweet) at a finer level of granularity is needed.

However, inferring location at a finer level (e.g., at geographic venues level) for social messages (e.g., tweets) is a difficult and challenging task. Other than location-based services (e.g., Foursquare) that explicitly let users choose a point of interest/venue for their checkins, most social media applications on mobile devices (e.g., Twitter or Instagram) provide geotagging in the form of associating a latitude-longitude pair with a social message (e.g., tweet) and/or a photo.

Additionally, geotagging in the form of coordinates may not always be very precise, especially within a confined geographic area. For example, it can be ambiguous to determine from geotags whether a social message (e.g., tweet) was posted at an Apple Store or a Starbucks next door. Hence, creating a one-to-one correspondence between latitude-longitude pairs and POIs/venues is not trivial. The problem becomes even harder in scenarios where users post social message (e.g., a tweet or Facebook post) about food on the way home after they have explored a good restaurant, although it would be desirable to associate such social messages (e.g., tweets) with the restaurant. Therefore, geotags for some social messages (e.g., tweets) are inherently noisy, in terms of their practical usability.

SUMMARY

The present disclosure addresses the challenges described above of predicting the geo-location and venue of a social message (e.g., tweet). Since only a small percentage of social messages (e.g., tweets) are geotagged, the present disclosure describes systems and methods to infer the geographic venue of a non-geotagged social message (e.g., tweet). As used herein, "geotagged social messages" are social messages that have geographical identification metadata added to the social messages. The geographical identification metadata can include latitude and longitude coordinates, altitude, bearing, distance, accuracy data, and/or place names, among others. Geotagging helps users find a wide variety of location-specific information.

Systems and methods according to implementations of the present disclosure make use of other social message (e.g., tweets, Facebook posts, etc.) by the user and social message (e.g., tweets) posted by the user's social network. In some implementations, an approach is presented to solve the problem by analyzing the social activities embedded in a constructed heterogeneous information network and leveraging available but limited geographic data. Inferring the location of non-geotagged social messages (e.g., tweets without geographical identification metadata) in accordance with some implementations can facilitate better understanding of users' geographic context, which can enable better inference of a geographic intent in search queries, more appropriate placement of advertisements, and display of information about events, points of interest, and people in the geographic vicinity of the user.

In some implementations, methods are disclosed for identifying the specific venue and location of a non-geotagged social message (e.g., a non-geotagged tweet), which simultaneously indicates the geographic location at a very fine-grained granularity and the venue name that is associated with the social message (e.g., tweet). Social network information is encoded using the meta-path technique. Geographic information embedded in the social network is also used. A classifier is trained to compute the probability of whether a tweet and geo-located venue are linked, providing generalization to new venues. The candidate geo-located venue with the highest probability of being linked to the social message (e.g., tweet) can be selected as the social message (e.g., tweet) venue and location.

Experimental results, some of which are described herein, demonstrate the performance of the some implementations of the technology described in the present disclosure on the problem of inferring geographic venues for social messages. For example, the performance of four types of social relation features and three types of geographic features embedded in a social network was examined when predicting whether a tweet and a venue are linked. Using these features to infer the geographic venue of a non-geotagged tweet from over 19 thousand possibilities, an average top-5 accuracy of 29 percent was observed.

It should be noted that the methods and systems disclosed herein in accordance with some implementations are particularly useful for venue inference of non-geotagged social messages. However, the methods and systems disclosed herein in accordance with some implementations can also assist venue inference of geotagged social messages. For example, using the methods and systems disclosed herein, venue inference can be performed on geotagged social messages.

In accordance with some implementations, a method for inferring venues from social messages includes: at a computer system with one or more processors and memory storing instructions for execution by the processor: accessing a collection of venues and training a classifier that predicts whether or not a social message is linked to a venue in the collection of venues; receiving a new social message that is not geotagged; for each venue in the collection of venues: identifying for the new social message corresponding meta-paths to the particular venue; encoding the corresponding meta-paths as a feature vector for the trained classifier, wherein each element of the feature vector includes a measure based on a respective type of social message connected to the particular venue; computing by the trained classifier a score for each venue in the collection of venues indicating whether the new social message is linked or not linked to the venue; and based on the scores, identifying at least one candidate venue as a predicted venue for the new social message and associating the predicted venue with the new social message.

In some implementations, training a classifier that predicts whether or not a social message is linked to a venue in the collection of venues includes: accessing a set of training social messages; obtaining a plurality of social message and venue pairs, wherein each social message and venue pair in the plurality of social message and venue pairs has a training social message from the set of training social messages and a venue from the collection of venues; for a pair in the plurality of social message and venue pairs: encoding the respective training social message in the pair as a label, wherein the label indicates whether the training message is linked or not linked to the venue; identifying for the respective training social message corresponding training meta-paths to the respective venue in the pair; encoding the corresponding training meta-paths to a corresponding training feature vector, wherein each element of the corresponding training feature vector includes a measure based on a respective type of the respective training social message connected to the respective venue in the pair; and giving the encoded labels and training feature vectors to the classifier for training.

In some implementations, identifying for the new social message corresponding meta-paths to the particular venue includes: obtaining a social graph as a social network schema based on types of entities and relationships extracted from a collection of messages and the collection of venues, wherein each type of entities is represented as a type of node in the social network schema and the relationships between the entities are represented as different types of links; and based on the social graph, content of the new social message and/or a user writing the new social message and/or social friends of the user, identifying for the new social message corresponding meta-paths connecting the new social message to the particular venue, wherein each of the corresponding meta-paths represents a type of path within the social network, containing a certain sequence of link types.

In some implementations, the meta-paths include one or more of: an EGOPATH that directly relates a user's social messages to venues, a FRIENDPATH that relates a user's social messages to venues through their friends, an INTERESTPATH that expands the relationship between social messages and venues through venue categories, and a TEXTPATH that models the content in social messages about venues.

In some implementations, the measure includes a frequency of a respective type of social messages connected to the particular venue, and encoding the corresponding meta-paths as a feature vector for the trained classifier includes: obtaining path counts for each of the corresponding meta-paths representing the frequency of the respective type of social messages connected to the particular venue; and setting the path counts as the measure in each element of the feature vector.

In some implementations, the method further includes: combining the path counts for different meta-paths to create an overall feature matrix.

In some implementations, the measure is an egogeo score for a tweet $t_i$ being posted by user $u_i$ at venue $v_p$ that measures a closest distance between geotagged social messages of a user who posted a non-geotagged message and the respective venue.

In some implementations, the measure is an egogeo score calculated by $EGOGEO(t_i,v_p) = -\log(\min_{t_j \in T_i - t_i} \|t_j - v_p\| + \epsilon)$, $T_i$ denotes the set of geotagged social messages posted by $u_i$, $d(.,.)$ denotes the distance between a geotagged social message and a venue, and $\epsilon$ is added to avoid underflow with default value $10^{-9}$.

In some implementations, the measure is a friendgeo score that measures a closest distance between geotagged social messages of friends of a user who posted the new social message and the respective venue.

In some implementations, the measure is a friendgeo score calculated by $FRIENDGEO(t_i,v_p) = -\log(\min_{t_j \in T_k, u_k \in N_i} \|t_j - v_p\|_1 + \epsilon)$.

In some implementations, the classifier is a support vector machine (SVM) with a linear kernel and default parameters, and probability estimates are enabled as the classifier output. In some implementations, other well known classifiers are used, including but not limited to information fuzzy networks, multilayer perceptron, naïve Bayes, random forest and artificial neural networks. A more comprehensive list of classifiers that can be employed with some implementations is provided at http://en.wikipedia.org/wiki/Category:Classification_algorithms, the descriptions of which are incorporated herein by reference.

In some implementations, based on the scores, identifying at least one candidate venue as a predicted venue includes: identifying at least one candidate venue with a highest score represented as a probability as the predicted venue.

In some implementations, the collection of venues is selected based on at least one of a predefined region, a type of venue, a venue name, a preference by a user, a history of venue inference, or a distance from a geo-coordinate associated with a social message.

In some implementations, the new social message is not geotagged.

In accordance with some implementations, a first device includes memory, one or more processors, and one or more programs stored in the memory and configured for execution by the one or more processors. The one or more programs include instructions for: accessing a collection of venues and training a classifier that predicts whether or not a social message is linked to a venue in the collection of venues; receiving a new social message that is not geotagged; for each venue in the collection of venues: identifying for the new social message corresponding meta-paths to the particular venue; encoding the corresponding meta-paths as a feature vector for the trained classifier, wherein each element of the feature vector includes a measure based on a respective type of social message connected to the particular venue; computing by the trained classifier a score for each venue in the collection of venues indicating whether the new social message is linked or not linked to the venue; and based on the scores, identifying at least one candidate venue as a predicted venue for the new social message and associating the predicted venue with the new social message.

In accordance with some implementations, a non-transitory computer readable storage medium stores one or more programs to be executed by a computer system with memory and one or more processors. The one or more programs include: instructions for accessing a collection of venues and training a classifier that predicts whether or not a social message is linked to a venue in the collection of venues; instructions for receiving a new social message that is not geotagged; for each venue in the collection of venues: instructions for identifying for the new social message corresponding meta-paths to the particular venue; instructions for encoding the corresponding meta-paths as a feature vector for the trained classifier, wherein each element of the feature vector includes a measure based on a respective type of social message connected to the particular venue; instructions for computing by the trained classifier a score for each venue in the collection of venues indicating whether the new social message is linked or not linked to the venue; and based on the scores, instructions for identifying at least one candidate venue as a predicted venue for the new social message and associating the predicted venue with the new social message.

BRIEF DESCRIPTION OF THE DRAWINGS

FIG. 5 is a spatial distribution of verified venues used for inferring venues from social messages in accordance with some implementations.

FIG. 6 illustrates a distribution of the number of users with a given number of friends in Twitter and Foursquare in accordance with some implementations.

FIG. 7 illustrates an example of a network schema used for inferring venues from social messages in accordance with some implementations.

FIG. 8 illustrates examples of meta-paths used in the venue inference system for social messages in accordance with some implementations.

FIG. 9 illustrates example inputs to a classifier during training phase for inferring venues from social messages in accordance with some implementations.

FIG. 16 illustrates performance of different features used in Venue Inference for Tweets (VIT) in accordance with some implementations.

FIGS. 17A-17E illustrate a flow diagram of a method for displaying view information in accordance with some implementations.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
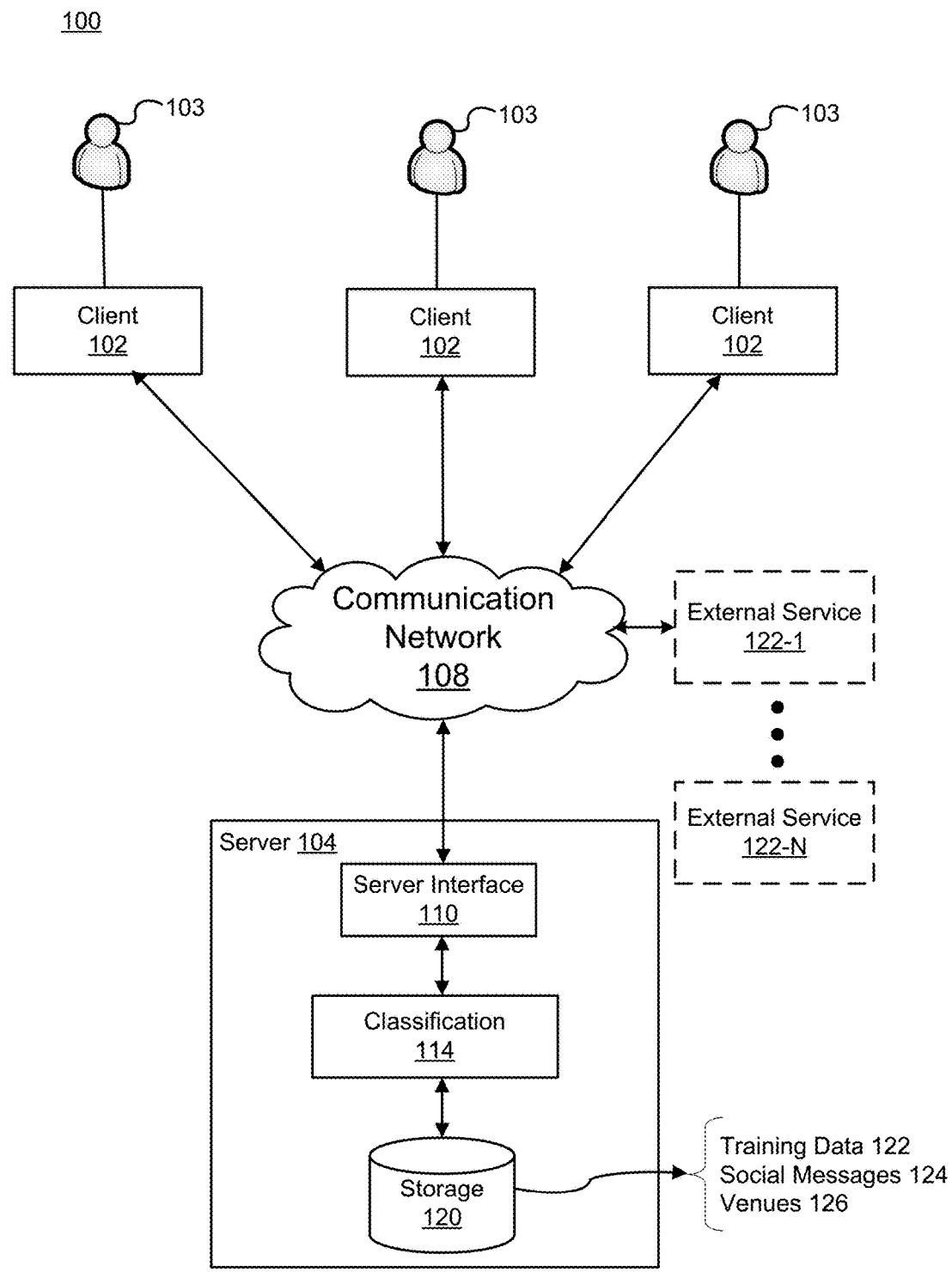
FIG. 1 is a block diagram illustrating a venue inference system for social messages in accordance with some implementations.

FIG. 1 is a block diagram of a distributed system 100 including a classification module 114 according to some implementations. The distributed environment 100 includes one or more clients 102, and a server 104 interconnected by one or more communication network(s) 108.

The client 102 (sometimes called the "client device" or "client computer") may be any computer or similar device through which a user 103 of the client 102 can submit requests to and receive results or services from the server 104. Examples include, without limitation, desktop computers, notebook computers, tablet computers, mobile devices such as mobile phones, personal digital assistants, set-top boxes, or any combination of the above. A respective client 102 may contain at least one client application for submitting application execution requests to the server 104. For example, the client application can be a web browser or other type of application that permits the user 103 to search for, browse, and/or use resources (e.g., webpages and web services) accessed from the server 104 via the communication network 108.

In some implementations, the client devices 104 are mobile devices such as laptops, smart phones etc., from which users 124 can execute messaging and social media applications that interact with external services 122, such as Twitter, Foursquare, and Facebook etc. The server 108 connects to the external services 122 to obtain the messages and the entity as well as venue data for venue prediction.

In some implementations, the client 102 also includes a local classification component that, in conjunction with the classification component 114 at the server 104, are components of a social message classification system, according to some implementations. In some implementations, as will be further described, the classification components are software applications for organizing and retrieving social messages from large-scale social media collections stored at the external services 122 or at the server 104. Optionally, the local classification component may be part of the client 102, or the local classification component may be implemented as part of the classification component 114 at the server 104. In other implementations, the local classification component and the classification component 114 can be implemented at separate servers or multiple servers.

The communication network 108 can be any wired or wireless local area network (LAN) and/or wide area network (WAN), such as an intranet, an extranet, the Internet, or a combination of such networks. In some implementations, the communication network 108 uses the HyperText Transport Protocol (HTTP) to transport information using the Transmission Control Protocol/Internet Protocol (TCP/IP). The HTTP permits client computers to access various resources available via the communication network 108. The various implementations, however, are not limited to the use of any particular protocol. The term "resource" as used throughout this specification refers to any piece of information and/or service that is accessible via a content location identifier (e.g., a URL) and can be, for example, a webpage, a document, a database, an image, a computational object, a search engine, or other online information service.

In some implementations, the server 104 distributes content (e.g., venues, social messages, web pages, images, digital photos, documents, files, advertisements, other forms of information). The server 104 may include many files or other data structures of various types, and those files or data structures can include any combination of text, graphics, video, audio, digital photos, and other digital media files. In some implementations, the server 104 includes a server interface 110, the classification component 114, and data storage 120. The server interface 110 is configured to handle requests from clients 102 and interact with the external services 122 via the communication network 108. The classification component 114 is a machine learning application that utilizes a large collection of existing social messages and venues, such as tweets stored by Tweeter, venues stored by Foursquare and/or other social media repositories, to generate a user tool that automates the organization or classification of social messages with enhanced scalability.

In some implementations, the server 104 connects to the external services 122 through the server interface 110 and obtains information such as social messages and venues gathered by the external services 120. The information obtained is then stored in the data storage 120 on the server 104. In some implementations, the data storage 120 stores a large collection of social messages 124 and venues 126 that are accessed when executing the local classification component and/or the classification component 114. The data storage 120 may store data that include training data 123, social messages 124, or venues 126. In some implementations, the training data 123 is a data set of encoded social messages that can be used to train the classification component 114 for classifying the social messages 124 according to implementations. In some implementations, the training data 123 is a subset of the social messages 124 and the venues 126. Once trained, the classification component 114 and/or the local classification component can be used to predict the possibility of the social messages 124 associated with the venues 126.

Figure 2:
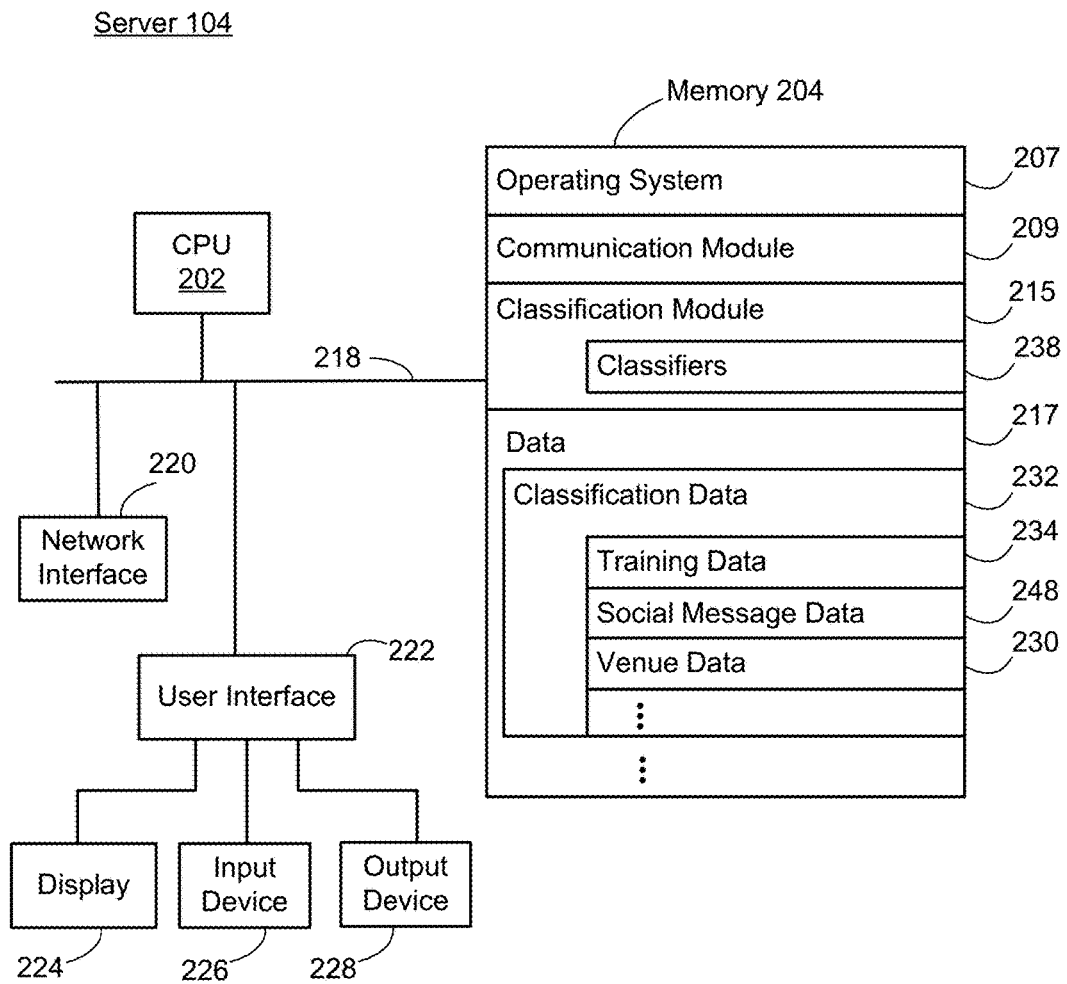
FIG. 2 is a block diagram illustrating a server system in accordance with some implementations.

FIG. 2 is a block diagram of the server system 104 of FIG. 1 according to some implementations. One or more components of the server system 104 may be accessed or executed from a single computer or from multiple computer devices; other generic components may be included but are not shown in the interest of brevity. The server system 104 generally includes one or more processing units (CPU's) 202, one or more network or other communications interfaces 220, memory 204, and one or more communication buses 218 for interconnecting these components. The communication buses 218 may include circuitry (sometimes called a chipset) that interconnects and controls communications between system components.

The server system 104 optionally includes a user interface 222 that includes, for instance, a display 224, input devices 226 and output devices 228. Input devices 226 can include, for example, a keyboard, a mouse, a touch-sensitive display screen, a touch-pad display screen, or any other appropriate device that allows information to be entered into the server system 104. Output devices 228 can include, for example, a video display unit, a printer, or any other appropriate device capable of providing output data. Note that input devices 226 and output devices 228 can alternatively be a single input/output device.

Memory 204 may include high speed random access memory and may also include non-volatile memory, such as one or more magnetic disk storage devices. Memory 204 may include mass storage that is remotely located from the central processing unit(s) 202. Memory 204, or alternately the non-volatile memory device(s) within memory 204, comprises a computer readable storage medium. Memory 204 stores the following elements, or a subset of these elements, and may also include additional elements:

- an operating system 207 that includes procedures for handling various basic server system services and for performing hardware dependent tasks;
- a communications module 209 that is used for connecting the server system 104 to other servers or computers via one or more communication networks (wired or wireless), such as the Internet, other wide area networks, local area networks, and metropolitan area networks and so on; in some implementations, the communication module 209 is part of the server interface 110;
- a classification module 114 that includes components (e.g., one or more classifiers 238) for training the media file classification system using large-scale collections of social messages and venues to automate venue inference, according to some implementations; and
- a data storage component 120 for storing classification data 232 to execute the classification module 114, which includes the following data:
  - training data 123, which includes a data set of encoded social messages and venue pairs that can be used to train the classification module 114 according to some implementations; in some implementations, the training data 123 is a subset of the social message data 124 and the venue data 126;
  - social message data 124, which includes encoded social messages collected from external services 126 according to some implementations; and venue data 126, which includes encoded venues collected from external services 122 according to some implementations.

Figure 3:
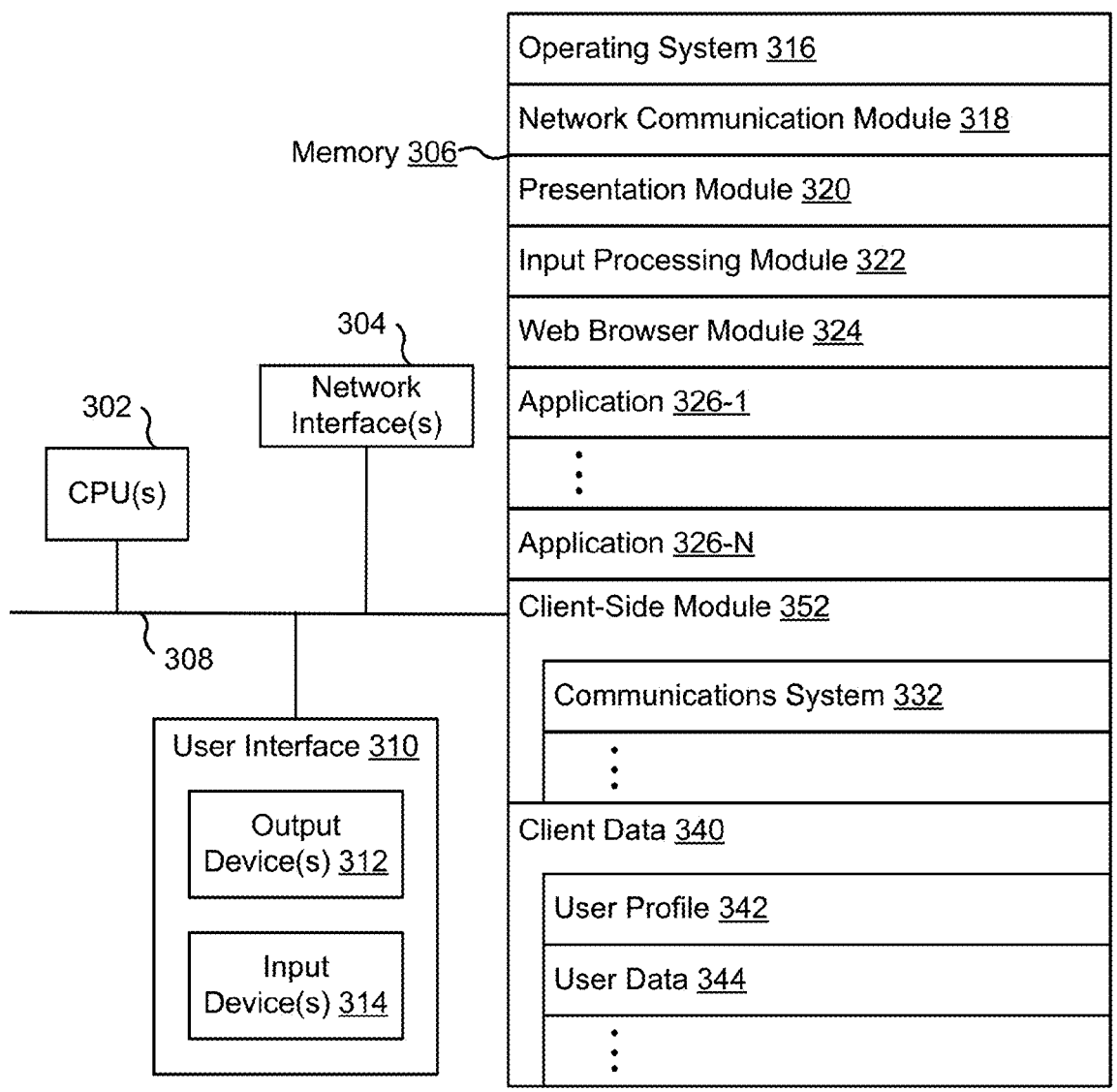
FIG. 3 is a block diagram illustrating a client device in accordance with some implementations.

FIG. 3 is a block diagram illustrating a representative client device 102 in accordance with some implementations. A client device 102 typically includes one or more processing units (CPUs) 302, one or more network interfaces 304, memory 306, a user interface 310, and one or more communication buses 308 for interconnecting these components (sometimes called a chipset). The user interface 310 includes one or more output devices 312 that enable presentation of media content, including one or more speakers and/or one or more visual displays. The user interface 310 also includes one or more input devices 314, including user interface components that facilitate user input such as a keyboard, a mouse, a voice-command input unit or microphone, a touch screen display, a touch-sensitive input pad, a camera (e.g., for scanning an encoded image), a gesture capturing camera, or other input buttons or controls. Furthermore, some client devices 102 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 102 to other computing devices (e.g., server system 104 and external service(s) 122) connected to one or more networks 108 via one or more network interfaces 304 (wired or wireless);
- presentation module 320 for enabling presentation of information (e.g., a user interface for a social networking platform, widget, webpage, game, and/or application, audio and/or video content, text, and/or displaying an encoded image for scanning) at client device 102 via one or more output devices 312 (e.g., displays, speakers, etc.) associated with user interface 310;
- input processing module 322 for detecting one or more user inputs or interactions from one of the one or more input devices 314 and interpreting the detected input or interaction (e.g., processing the encoded image scanned by the camera of the client device);
- one or more applications 326-1-326-N for execution by client device 102 (e.g., camera module, sensor module, games, application marketplaces, payment platforms, social network platforms, and/or other applications involving various user operations);
- client-side module 352, which provides client-side data processing and functionalities, including but not limited to:
  - communications system 332 for generating and sending requests for entity profiling and sending messages, including short messaging and/or instant message applications; and
- client data 340 storing data of a user associated with the client device, including, but is not limited to:
  - user profile data 342 storing one or more user accounts associated with a user of client device 102, the user account data including one or more user accounts, login credentials for each user account, payment data (e.g., linked credit card information, app credit or gift card balance, billing address, shipping address, etc.) associated with each user account, custom parameters (e.g., age, location, hobbies, etc.) for each user account, social network contacts of each user account; and
  - user data 344 storing usage data of each user account on client device 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, at least some of the functions of server system 104 are performed by client device 102, and the corresponding sub-modules of these functions may be located within client device 102 rather than server system 104. In some implementations, at least some of the functions of client device 102 are performed by server system 104, and the corresponding sub-modules of these functions may be located within server system 104 rather than client device 102. Client device 102 and server system 104 shown in FIGS. 3 and 2, respectively, are merely illustrative, and different configurations of the modules for implementing the functions described herein are possible in various implementations.

Figure 4:
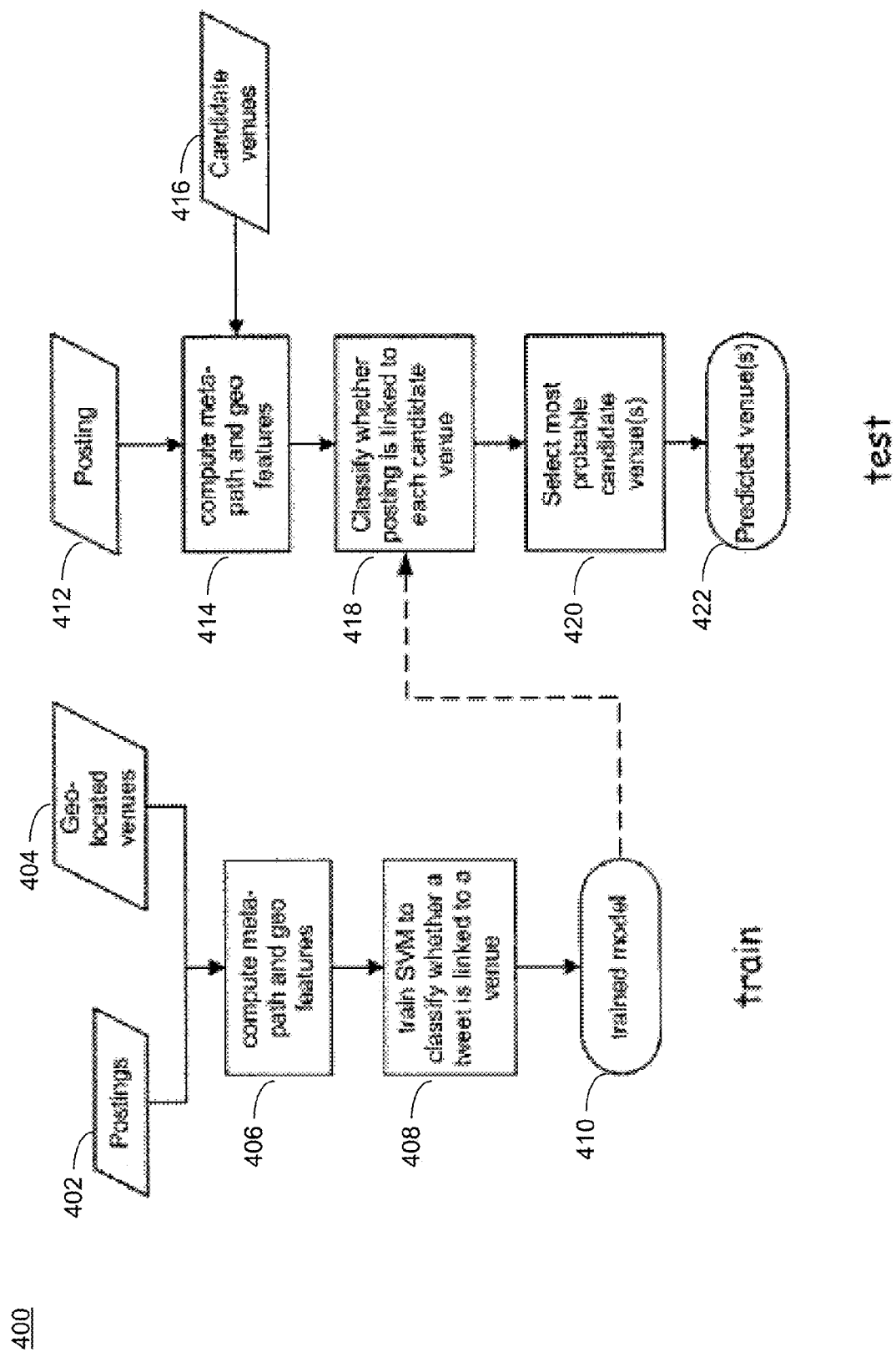
FIG. 4 is a flow chart illustrating a method for inferring venues from social messages in accordance with some implementations.

FIG. 4 is a flowchart of a venue inference method 400 for social messages in accordance with some implementations. In some implementations, the method 400 is performed in the venue inference system 100. In FIG. 4, the venue inference method 400 according to some implementations has a training phase and test phase. In the training phase, the server 104 accesses a collection of geo-located venues 404 stored in one or more external services (e.g., Foursquare) and a collection of postings 402 stored in one or more external services (e.g., Twitter). The collection of geo-located venues 404 and the collection of postings 402 are then used by the classification module 114 to train one or more classifiers 238. The one or more trained classifiers can then be used to predict whether or not a social message is linked to a venue in the collection of candidate venues 416 in a test stage. In some implementations, the set of venues in the candidate venues 416 and the set of venues in the geo-located venues 404 are the same. In some implementations, one or more smart filters can be applied to the geo-located venues so that the candidate venues 416 are selected based on at least one of a predefined region, a type of venue, a venue name, a preference by a user, or a history of venue inference of the geo-located venues 404.

The venue inference method 400 for social messages described herein can identify the location of a social message (e.g., tweet) as a specific venue, which simultaneously indicates the geographic location at a very fine-grained granularity and the venue name that is associated with the social message (e.g., tweet). Inferring the location and venue name of non-geotagged social messages (e.g., tweets) can facilitate better understanding of users' geographic context, thus allowing applications to more precisely present information, recommend services, and target advertisements. Furthermore, the venue inference system and method described herein can be evaluated using a large-scale dataset comprising social message postings and venues from social media platforms. FIGS. 5-16 illustrate applying the venue inference method 400 and evaluating the method 400 using a large-scale dataset comprising data collected from Twitter and Foursquare.

For example, as shown in FIG. 5, when collecting one sample large-scale dataset as the postings 402, a bounding box 502 in terms of latitude and longitude for the San Francisco Bay Area is defined. Using the geotag filter option of Twitter's streaming API, tweets within the bounding box within a time frame are collected as the postings 402. An alternative is to collect tweets based on users' home locations. The Twitter REST API is then invoked to collect each user's list of followers and followees. Friendship in Twitter is defined between users who mutually follow each other. In one sample data collection of tweets from June 2013 to April 2014, among 10,080,973 tweets collected, 3,276,724 friendship links were identified among 251,660 Twitter users, who generated the tweets. FIG. 6 shows the distribution of the number of friends per Twitter user, where the peak around 200 on the x-axis may be due to Twitter's follow limit at the time of the data collection, considering this is a subnetwork sampled from Twitter.

Using the Foursquare API, the non-private venues within the aforementioned bounding box 502 were collected, then all tips associated with each of these venues from February 2009 to June 2014 were recorded. The friendship information between users who posted these tips was also collected. The final dataset contained 400,941 tips generated by 105,340 Foursquare users associated with 84,338 venues, in addition to 253,653 venues without any tips. For evaluation, only those venues verified by the business owners in Foursquare were considered as the geo-located venues 404 and as the candidate venues 416, which were 19,084 in total, as visualized by pins in FIG. 5.

The Foursquare API also provides the corresponding Twitter account of a Foursquare user, if one exists. This information was collected in order to identify the same user across different social networks. Around 14.85% of the Foursquare users had a Twitter account linked to their Foursquare account. Because of privacy concerns, checkin records were not explicitly available from Foursquare. Instead, the mayorship information was collected, which denotes the user who had the most checkin records at a particular venue. Additionally, tweets sourcing from Foursquare were used as a sample of checkin records that users positively wanted to share with their friends.

Referring back to FIG. 4, after obtaining the large-scale dataset in accordance with implementations described above, the server 104 uses the postings 402 and the geo-located venues 404 to train the one or more classifiers 238 in a training phase. The server 104 first accesses a set of training social messages, such as postings 402 stored in external services 122 (e.g., tweets stored in Twitter). The server 104 then obtains a plurality of social message and venue pairs. Each social message and venue pair has a training social message from the set of training social messages, such as the postings 402, and a venue from the collection of venues, such as the geo-located venues 404. Using the plurality of social message and venue pairs, the server 104 computes (406) features based on meta-paths and geo-coordinate information. In some implementations, meta-paths are used to compute the features and the computed features include measures of geo features.

In some implementations, the computation (406) is performed for a pair in the plurality of social message and venue pairs, first encoding the respective training social message in the pair as a label, the label indicates whether the training message is linked or not linked to the venue. Having encoded the label, the server 104 further identifies for the respective training social message corresponding training meta-paths to the respective venue in the pair. Finally, the server 104 encodes the corresponding training meta-paths to a corresponding training feature vector, with each element of the corresponding training feature vector includes a measure based on a respective type of the respective training social message connected to the respective venue in the pair. In some implementations, the path counts for different meta-paths are combined to create an overall feature matrix and the overall feature matrix is represented as the training feature vector. The encoded training feature vectors representing the meta-path and geo-features and the encoded label are then given to the classifier in step 408 to train the classifier, such as Support Vector Machines (SVM), to classify whether a social message (e.g., a tweet) is linked to a venue. The trained model 410 is generated as a result of the training (408) to conclude the training phase.

In test phase, a new social message, such as a posting 412, can be received by the server 104 from the external services 122. In some implementations, the posting 412 is not geotagged. The server 104 can use the trained model 410 to classify (418) whether the non-geotagged posting 412 is linked to each candidate venue in a collection of candidate venues 416. In order to perform the classification (418), the server 104 performs similar pre-processing steps described above with respect to the step 406 in the training stage, such that in test stage, the server 104 pre-processes the posting and the candidate venues 416 to compute (414) meta-path and geo-features. In some implementations, the computation (414) includes first identifying for the new posting 412 corresponding meta-paths to the particular venue, followed by encoding the corresponding meta-paths as a feature vector for the trained classifier 410, each element of the feature vector includes a measure based on a respective type of meta-path based connection between the social message and the particular venue.

In some implementations, the pre-processing and computation steps 406 and 414 described above can be carried out using a heterogeneous information network as a schema. Based on multiple types of entities and relationships collected, the heterogeneous information network can be constructed in order to analyze the embedded social relations, and leverage available but limited geographic data to identify the location of social messages (e.g., tweets) as geographic venues. FIG. 7 illustrates an exemplary information network constructed using the dataset collected according to methods described above.

In FIG. 7, each type of entity is represented as a type of node in the network schema, e.g., users, tweets, tips, venues. Relationships between these entities can be represented as different types of links, e.g., write, locate, anchor links. Notice that words are also represented as a type of node in the network schema. For text processing, stop words are removed using NLTK from http://www.nitk.org and those words appearing in less than ten tweets are filtered out. A contain link is added between a tweet/tip and a word if the word appears in the tweet/tip.

Since only a small percentage of tweets are geotagged, systems and methods according to implementations are used to infer the geographic venue where a non-geotagged tweet was posted. Table 1 below lists four examples of geotagged tweets in the dataset collected according to methods described above. Based on the analysis of the dataset, most of tweets sourcing from Foursquare are in the format "I'm at somewhere", which makes it trivial to infer a venue for this type of tweet. Hence, in some implementations, as described above, checkin is first explicitly added as a type of link into the constructed network in FIG. 7 for the tweets sourcing from Foursquare, which were then removed from the set of tweets for evaluation.

TABLE 1

Examples of geotagged tweets

| | |
|---|---|
| $t_1$ | I'm at Whole Foods Market-@wholefoodsnorca (San Francisco, CA) w/4 others [Foursquare] |
| $t_2$ | I'm at @Pier39 (San Francisco, CA) w/6 others [Foursquare] |
| $t_3$ | BEST BURGERS EVER WITH @username ?? @ Smashburger [Instagram] |
| $t_4$ | New insurance = Massive headaches at the pharmacy. ? (at @walgreens) [Path] |

Note:
The source of each tweet is indicated in brackets.

In some implementations, the dataset used for evaluation includes geotagged tweets from sources other than Foursquare. Similar to Foursquare, several other popular mobile apps (e.g., Instagram, Path) enable users to tag their posts with geographic information. As shown in Table 1, "@" is usually followed by a venue name in geotagged tweets (e.g., @walgreens in $t_4$), but can also be used to mention another user (e.g., @username in $t_3$). Tweets posted by other apps may be geotagged with the user's current location. For the dataset used for the experiments, a subset of tweets are selected. The subset of tweets contain in the text either venue name or, to allow for shortened names, at least half the content words in venue name. Additionally, in order to disambiguate actual venues from user-mentions with "@", the geo-location of the tweet is required to be in the neighborhood of the matching venue; neighbor-hood in the experiments is defined to be a radius of 0.0008 degrees, or about 290 ft. In this way, the actual venues for 126,917 tweets are obtained. Words following "@" are removed from tweets for model learning and testing using cross-validation. The coordinates of tweets are also withheld, except for usage in evaluation. Overall, each tweet is treated as if it were non-geotagged when a model is trained. An investigation is also carried out when geographic information is available for tweets other than the current tweet.

Using the network schema as shown in FIG. 7, different types of meta-path can be extracted. The problem of venue inference for tweets can be formalized as: given a non-geotagged tweet estimate the tweet's probability of being posted at a venue $v_p$, $p(link(v_p|t_i)=1)$, such that the venue with the maximum probability $v_{est}(t_i)$ is the tweet's actual venue $v_{act}(t_i)$.

As used herein, a meta-path corresponds to a type of path within the network schema, containing a certain sequence of link types. For example, in FIG. 7, a meta-path

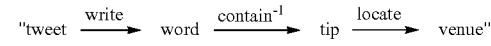

denotes a composite relationship from tweets to venues. The semantic meaning of this meta-path is that the tweet and the venue share common words via tips. The link type "contain$^{-1}$" represents the inverted relation of "contain". The tweet and venues connected through the meta-path can be regarded as being more likely to be linked than those without such correlations.

Different meta-paths usually represent different relationships among linked nodes with different semantic meanings. For example, the meta-path

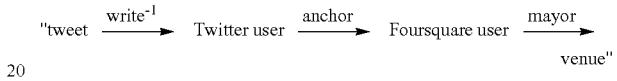

denotes that the tweet was posted by a Twitter user who is a mayor of the venue in Foursquare, while the meta-path

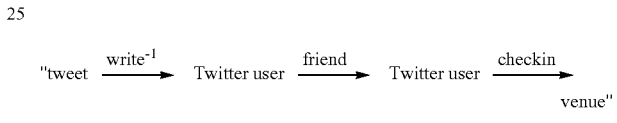

indicates the tweet was posted by a Twitter user whose friend checks in at the venue. In this way, relationships between tweets and venues can be described by different meta-paths with different semantics. Thus, four types of meta-paths as shown in FIG. 7 are extracted and summarized in FIG. 8.

In FIG. 8, Ego Path directly relates a user's tweets to venues. Given a tweet-venue pair, say, $(t_i, v_p)$, the user who posted the tweet $t_i$ is denoted as $u_i$. To infer the existence probability of the link $(t_i, v_p)$, e.g., $p(link v_p|t_i)=1)$, it would be very useful to know if $u_i$ has any type of direct interactions with the venue, e.g., check in at, writing a tip about, being a mayor of, which are referred as social activities thereinafter. As described above, the meta-path

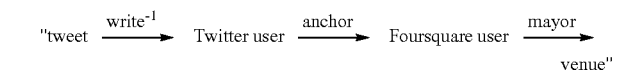

could detect if $t_i$ was posted by $u_i$ who is a mayor of $v_p$, in Foursquare. Obviously, $t_i$ should be more likely to be associated with the venue $v_p$ if there exists such a meta-path from $t_i$ to $v_p$ than those venues without such connections. Similarly, other meta-paths are extracted to capture the correlations between $t_i$ and $v_p$ via $u_i$, as summarized in FIG. 8, denoted as EGOPATH.

Friend Path relates a user's tweets to venues through their friends. Although EGOPATH can be expected to be very important to represent the correlations between $t_i$ and $v_p$ by leveraging explicit social activities of $u_i$ across Twitter and Foursquare, it is observed that only a small number of tweets can be inferred in this way, which is especially hard for the users who do not have linked Foursquare accounts. It was observed in some research that social relationships can explain about 10% to 30% of all human movement. Inspired by the idea of the homophily principle in social science, in addition to looking at the social activities of one can also exploit the activities of $u_i$'s friends. It is considered that if a friend $u_j$ has any social activities at the venue $v_p$, the user $u_i$ is more likely to post the tweet $t_i$ at $v_p$ than those venues without such connections. For example, the meta-path

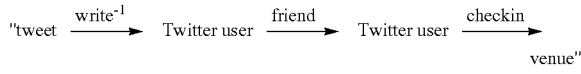

can tell whether any friends of $u_i$ have checkins at the venue $v_p$. The meta-paths leveraging friends' information is denoted as FRIENDPATH, as summarized in FIG. 8.

Interest Path expands the relationship between tweets and venues through Foursquare categories. Taking into consideration the user interests, it is assumed that users tend to tweet at similar venues which attract their interests. For example, $v_p$ is Chef Chu's in Los Altos, $v_q$ is Cooking Papa in Mountain View, and both of them belong to the category Chinese restaurant. Intuitively, if the user $u_i$ has checkins at $v_q$, indicating he/she likes Chinese food, then $t_i$ is more likely to be posted by $u_i$ at $v_p$ than those venues without such connections. In the collected data from Foursquare, each venue is associated with one of the 429 categories, as illustrated by the link type belong in FIG. 7. The meta-path

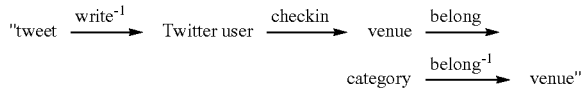

can effectively detect whether $t_i$ was posted by a user who has checkins at venues sharing the same category as $v_p$. Such type of meta-paths is denoted as INTERESTPATH in FIG. 8.

Text Path models the words tweeted about venues. Unlike conventional approaches that focus on text processing for content analysis, words are represented as a type of nodes in the constructed network schema in FIG. 7. Following the idea of meta-path, a meta-path via words is defined to represent textual similarity between tweets and venues. For example, the meta-path

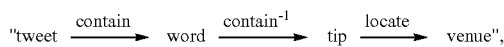

denoted as TEXTPATH, can encode whether the tweet $t_i$ and the venue $v_p$ share common words via tips. It is considered that $t_i$ should be more likely to be associated with $v_p$ sharing similar textual content than those venues without such correlations.

Having obtained the meta-path, the path counts of the meta-paths can be computed and used as elements of the feature vectors input to one or more classifiers 238 in order to determine whether a social message (e.g., a tweet) is linked or not linked to a venue. In some implementations, the path counts for the different meta-paths for a path type can be optionally summed to pool sparse path counts. For example, the three EGOPATHS can be combined (e.g., summed). In addition to calculating meta-path and summing the path counts, in pre-processing and computation steps 406 and 414, the server 104 also calculates geo-features in accordance with some implementations. The geo-features represent the available geographic information contained in the geotagged tweets of the user or the user's friends. The geo values can be used as additional features representing each social message and venue pair. It should be noted that these features do not include the geo-location of the social messages (e.g., tweets) themselves; thus the venue inference method in accordance with some implementations applies to social messages without geotags. In some implementations, the geo-features are represented in two ways: Ego Geo score and Friends Geo score.

In some implementations, the Ego Geo score is used to facilitate venue inference for a tweet $t_i$ if one has the geographic information of other tweets posted by user $u_i$. Let $T_i$ denote the set of geotagged tweets posted by $u_i$, a geographic score between $t_i$ and a candidate venue $v_p$ can be defined as follows:

$$EGOGEO(t_i, v_p) = -\log\left(\min_{t_j \in T_i - t_i} \|t_j - v_p\|_1 + \epsilon\right)$$

where $\|\cdot\|_1$ denotes the Manhattan distance between a geotagged tweet and a venue, and $\epsilon$ is added to avoid underflow with default value $10^{-9}$.

The formulation above is to measure the closest distance between geotagged tweets of the user who posted $t_i$ and a candidate venue $v_p$. Intuitively, $t_i$ is more likely to be associated with $v_p$, if $u_i$ has posted any geotagged tweet in the neighborhood of $v_p$. Therefore, the higher the value of $EGOGEO(t_i, v_p)$, the higher the existence probability of the link $(t_i, v_p)$.

In some implementations, Friends Geo score is used in scenarios where users come to a new place and tweet, EGOGEO would not be able to capture such information. However, considering people usually hang out with friends and may tweet at some interesting places together, the Friends Geo measure is purposed based on friends' geotagged tweets:

$$FRIENDGEO(t_i, v_p) = -\log\left(\min_{t_j \in T_k, u_k \in N_i} \|t_j - v_p\|_1 + \epsilon\right)$$

where $N_i$ is the set of users who are friends of $u_i$, and $T_k$ are the tweets by $u_k$.

The formulation is to measure the closest distance between geotagged tweets of $u_i$'s friends and a candidate venue $v_p$. Therefore, if $u_i$'s friends have posted any geotagged tweet in the neighborhood of $v_p$, $t_i$ is more likely to be associated with $v_p$ than venues without such correlations. Therefore, one can say that the existence probability of the link $(t_i, v_p)$ is likely to be positively correlated with $FRIENDGEO(t_i, v_p)$, i.e., $P(y(t_i, v_p)=1) \propto FRIENDGEO(t_i, v_p)$.

Referring back to FIG. 4, having computed the feature vectors in steps 406 and 414, the feature vectors can be given to the one or more classifiers 238 as inputs in the training step 408 and the classification step 418. In some implementations, a classifier includes Support Vector Machines (SVM). For example, SVM implemented in SCIKIT-LEARN7 with a linear kernel and default parameters can be used as the classifier with features such as the meta-paths and the geo-features described above, and probability estimates are enabled as output. A common use of SVMs is to train a separate one-against-all model for each class. In the venue inference task, this may require training a separate SVM for each geographic venue. However, the input features of venue inference implicitly encode the social message and venue so that one SVM model is trained to classify whether the link between a social message and a venue is positive or negative. This approach has the advantage of generalization to new venues. An example input to the classifier including 60 encoded social messages and the corresponding label for a verified venue is shown in FIG. 9.

In FIG. 9, each feature vector (e.g., 901-1, 901-2, 901-3, 901-4, 901-5, and 901-6 etc.) includes path counts such as the ego path 902, social path 904, interest path 906, and text path 908 for each venue and social message pair. In addition to the path counts, the feature vector includes geo values such as Ego Geo score 910 and Friends Geo score 912 for each social message. Each social message is encoded in the label vector 920 as 1 for linked and 0 for not-linked respectively. Other common encoding, such as 1 and −1, or other pairs of unique integers can also be used to represent whether a social message is linked or not linked to a verified venue.

For example, the first element in the label vector 920 has a value of 1 indicating the corresponding tweet encoded as 918372 being linked to a venue encoded as 1038. The corresponding feature vector 901-1 shows tweet 918372 is linked to the venue 1038 via 5 ego paths, 0 friend path, 12 interest paths, and 3 text paths. In addition, the feature vector 901-1 includes an Ego Geo score of 20.72326584 calculated by a measurement of a closest distance between the geo location of other tweets posted by a user, who posted the social message 918372, and the venue 1038. The feature vector 901-1 also includes a Friends Geo score of 8.72692089 calculated by a measurement of a closest distance between the geo location of tweets posted by the user's friends and the venue 1038.

Referring back to FIG. 4, after the classifier receives the inputs, such as the exemplary feature vectors and label vectors shown in FIG. 9, in some implementations, the system generates the trained model 410, which includes encoded postings 402 and encoded geo-located venues 404, among others. The trained model 410 can be used to classify (418) whether a new social message, such as a posting 412 is linked or not linked to each candidate venue 416. In some implementations, in test stage, using the trained model 410, the trained classifier 238 (e.g., the SVM) can compute a score for each venue in the candidate venues 416 indicating whether the new social message, such as the posting 412 is linked or not linked to the venue. Based on the scores, the server 104 can identify at least one candidate venue as a predicted venue for the new social message and associating the predicted venue with the new social message. In some implementations, the server 104 selects (420) one or more the most probable candidate venue(s) from the trained SVM output, the trained SVM has a linear kernel, default parameters, and probability estimates enabled as outputs. The selected candidate venue(s) are considered as predicated venue(s) 422.

In some implementations, experiments can be conducted in the setting of 3-fold cross-validation. In each fold of training data, half of the known links between tweets and venues are sampled as positive links. For links in the other half, say $(t_i, v_p)$, a venue $v_q$ can be randomly generated from $V - v_p$ to form a negative link $(t_i, v_q)$. In this way, a balanced dataset, such as the one depicted in FIG. 9 can be derived for the training process, containing the same number of positive links and negative links, e.g., 901-1, 901-2, and 901-3 are feature vectors for positive links, and 901-4, 901-5, and 901-6 are feature vectors for negative links. Known links in the test set can be used for evaluation.

Figure 10:
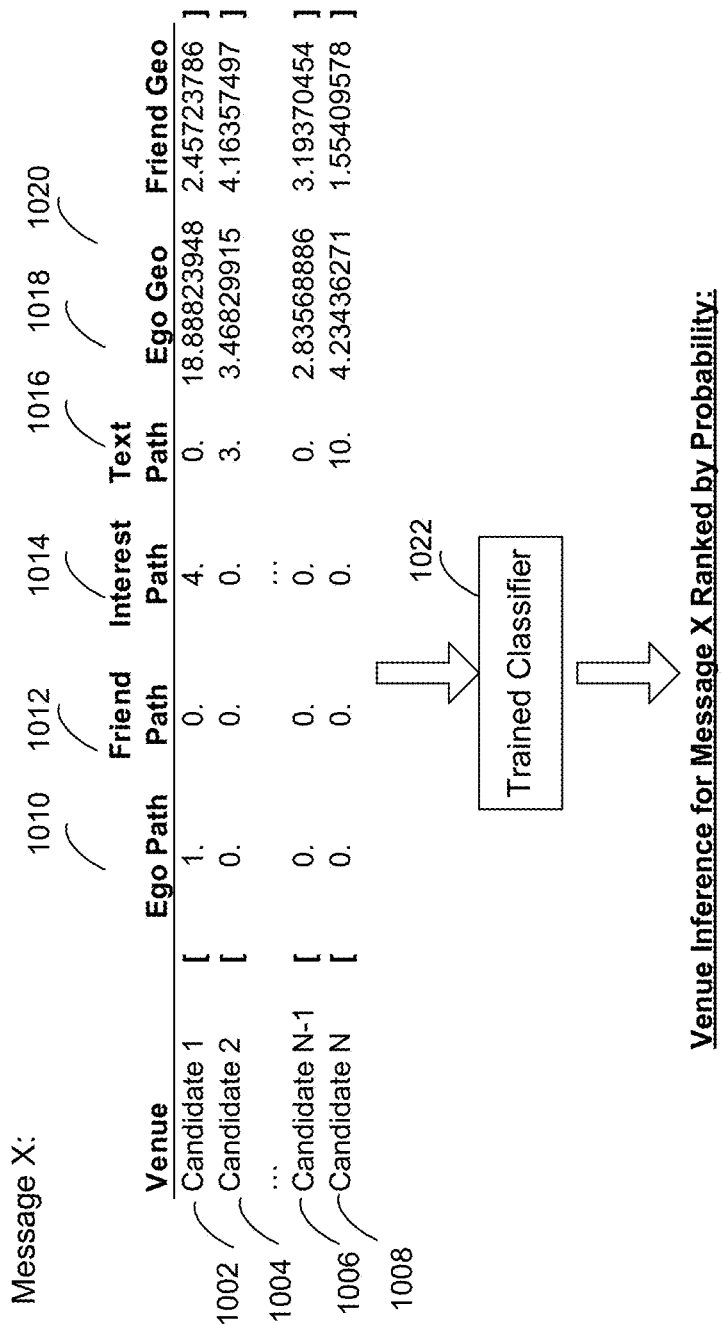
FIG. 10 illustrates a flow chart illustrating using a trained classifier for inferring venues from social messages in accordance with some implementations.

For example, FIG. 10 illustrates venue inference of a social message during test phase in accordance with some implementations. During evaluation, in some implementations, a matrix relating a new social message posting (e.g., Message X) to the user writing the social message can be created. The matrix is of size the number of features in the feature vector and the number of new social messages. If the user is a new user, then the meta-path matrices with users as an axis are updated to include the new user if possible. In some cases, the users may not have an account in the venue external services, such as Foursquare, such that receiving new social messages written by these users would not cause similar updates. After the user updates, for each pair of incoming tweet and possible venue, the test feature vectors, such as 1002-1008 in FIG. 10 can be computed using matrix multiplication in the same way the training feature vectors are computed. Each feature vector has elements such as the meta-path counts 1010-1016 and the geo scores 1018-1020. The test feature vectors can then be given to the trained classifier 1022 (e.g., a trained SVM) to predict the probability of the social message and candidate venue being linked. The venues are ranked by probability of being linked.

For example, as shown in FIG. 10, ranking from the highest to lowest, candidate venue 1, N, 2, and N−1 are 95%, 78%, 46%, and 5% likely to be linked to message X respectively. Message X is linked to candidate venue 1 via 1 ego path and 4 interest paths and has the highest Ego Geo score relative to other candidate venues shown in FIG. 10. In comparison, Candidate venue N−1 has no ego path, friend path, interest path, or text path linking candidate venue N−1 to message X and has the lowest Ego Geo score. Thus, message X is more likely to be linked to the candidate venue 1 and is less likely to be linked to the candidate venue N−1.

To evaluate the quality of the venue inference system and method disclosed herein, the inferred venue of a tweet versus the actual venue can be compared. In some implementations, the first metric to be considered is ErrDist which quantifies the distance in miles between the location of the actual venue and the location of the inferred venue. The ErrDist is defined as follows:

$$ErrDist = \frac{\sum_{t_i \in T} d(v_{act}(t_i), v_{est}(t_i))}{|T|}$$

where T is the set of test tweets.

A low ErrDist means that the model can geo-locate tweets close to their actual venue, but it cannot directly provide a strong intuition about the distribution of venue inference errors. Therefore, Accuracy is considered to measure the percentage of tweets with their inferred venue correctly matched with the actual venue:

$$Accuracy = \frac{\sum_{t_i \in T} I(v_{act}(t_i), \{v_{est}(t_i)\})}{|T|}$$

where identity function $$I(a, S) = \begin{cases} 1, & \text{if } a \in S \\ 0, & \text{otherwise} \end{cases}$$

can check whether the actual venue can be matched within the set of inferred venues.

Since the venue estimator predicts k venues for each tweet in decreasing order of confidence, the ErrDist with k predictions is denoted as ErrDist@k, which applies the same ErrDist metric over the venues in the top-k and chooses the least error distance to the actual venue:

$$ErrDist@k = \frac{\sum_{t_i \in T} \min_{j=1 \ldots k} d(v_{act}(t_i), v_{est_j}(t_i))}{|T|}$$

where $v_{est_j}(t_i)$ is the j-th venue predicted for $t_i$ in decreasing order of confidence.

Similarly, the Accuracy with k predictions is defined as Accuracy@k:

$$Accuracy@k = \frac{\sum_{t_i \in T} I(v_{act}(t_i), \bigcup_{j=1}^{k} \{v_{est}(t_i)\})}{|T|}$$

In this way, the metrics show the capacity of a trained classifier to identify a good candidate venue, even if the first prediction is in error.

Based on features extracted from the constructed network as shown in FIG. 7 and available geographic data, the existence probability of any given link between tweets and venues can be identified. That is to say, P(link($t_i,v_p$)=1) can be predicted, the probability of $t_i$ being posted at $v_p$. Then a consideration is given to a given tweet how to identify its actual venue $v_{act}(t_i)$. An intuitive idea is to compute P(link($t_i,v_p$)=1), $\forall v_p \in V$ for each $t_i$, tweet where V is the set of candidate venues, and $v_p$ with the maximum probability P(link($t_i,v_p$)=1) could be our inferred venue $v_{est}(t_i)$. In this way, the size of V, i.e., |V|, would influence the efficiency of inference process, enumerate all the venues in V are enumerated. However, it can be optimized by sampling the most relevant venues, for example, venues connected via FRIENDPATH, TEXTPATH, etc.

Figure 11:
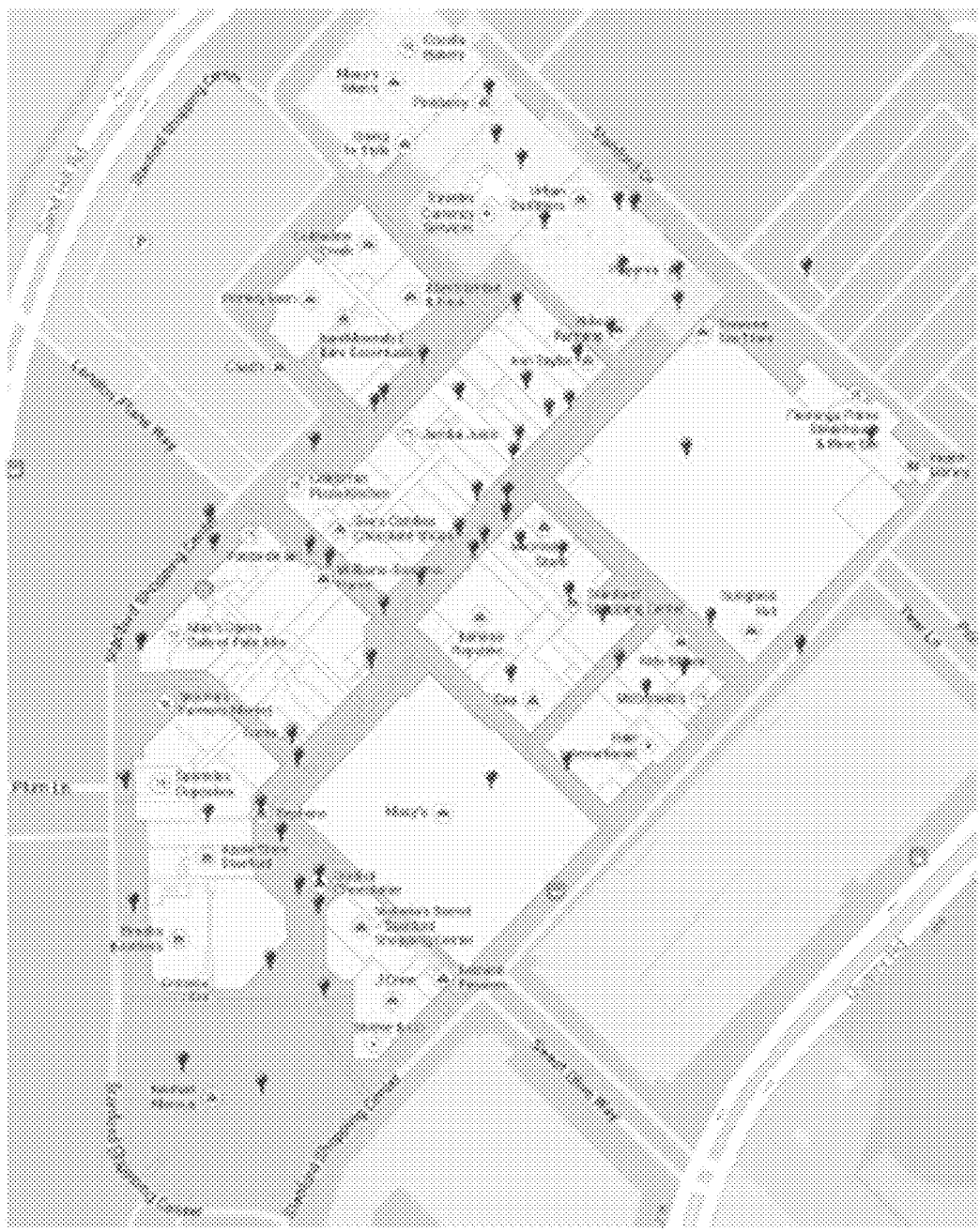
FIG. 11 illustrates spatial distribution of verified venues in the Stanford Shopping Center, collected from Foursquare in accordance with some implementations.

In some implementations, the application scenarios where one wants to figure out which specific venue a tweet was posted at within a confined geographic area (e.g., Stanford Shopping Center, as shown in FIG. 11) are primarily evaluated. Knowledge that the tweet was posted at the Stanford Shopping Center can be obtained in several ways. For example, the user mentions the Stanford Shopping Center or the user has geo-location service turned on when posting the tweet. Additional information such as the shopping center locations and the associated stores in the shopping center can be stored in the venue data 230 in order to obtain the geographical information.

Figure 12:
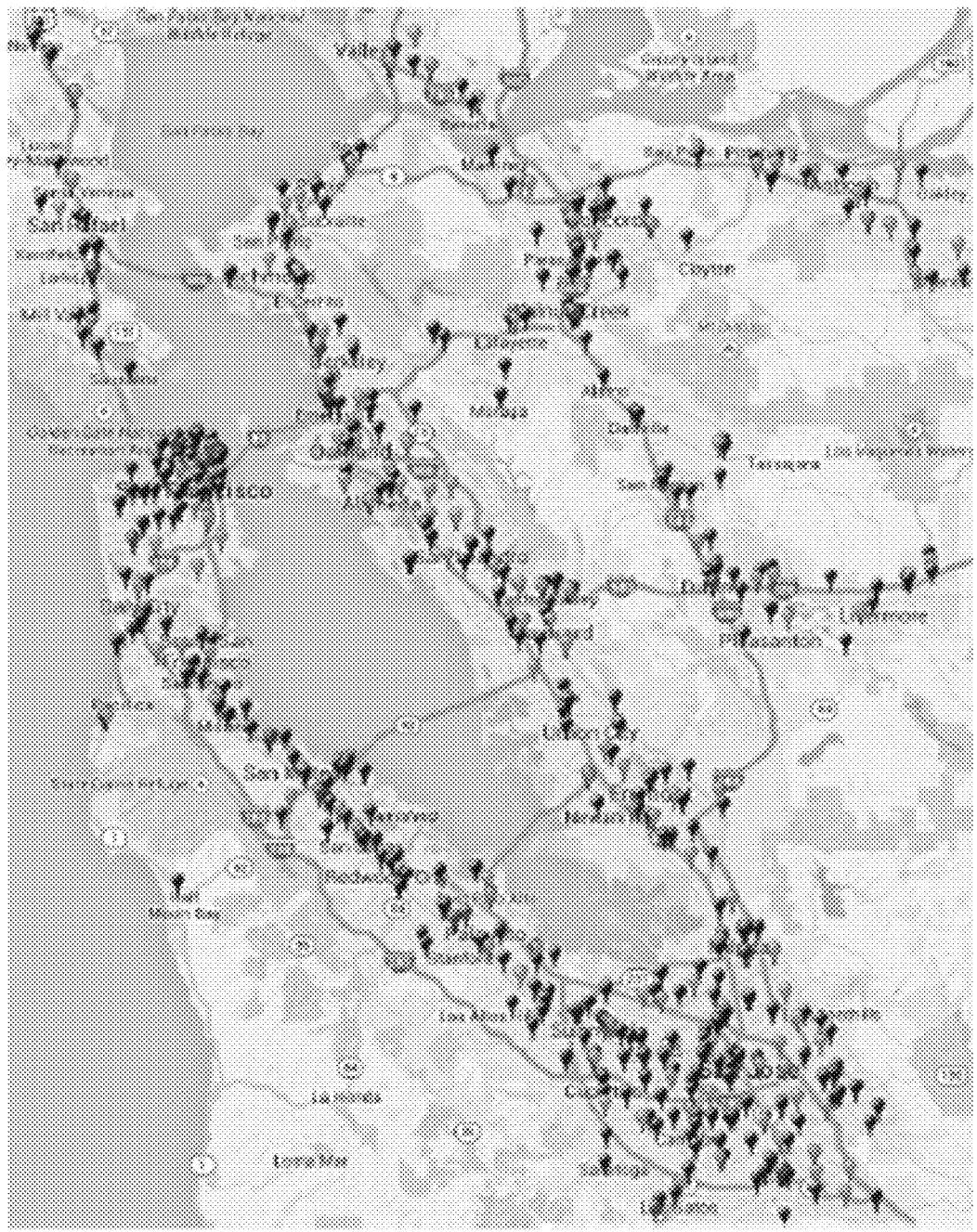
FIG. 12 illustrates spatial distribution of Starbucks (blue pins), McDonald's (green pins), and Apple Stores (red pins) in the San Francisco Bay Area in accordance with some implementations.
Figure 13:
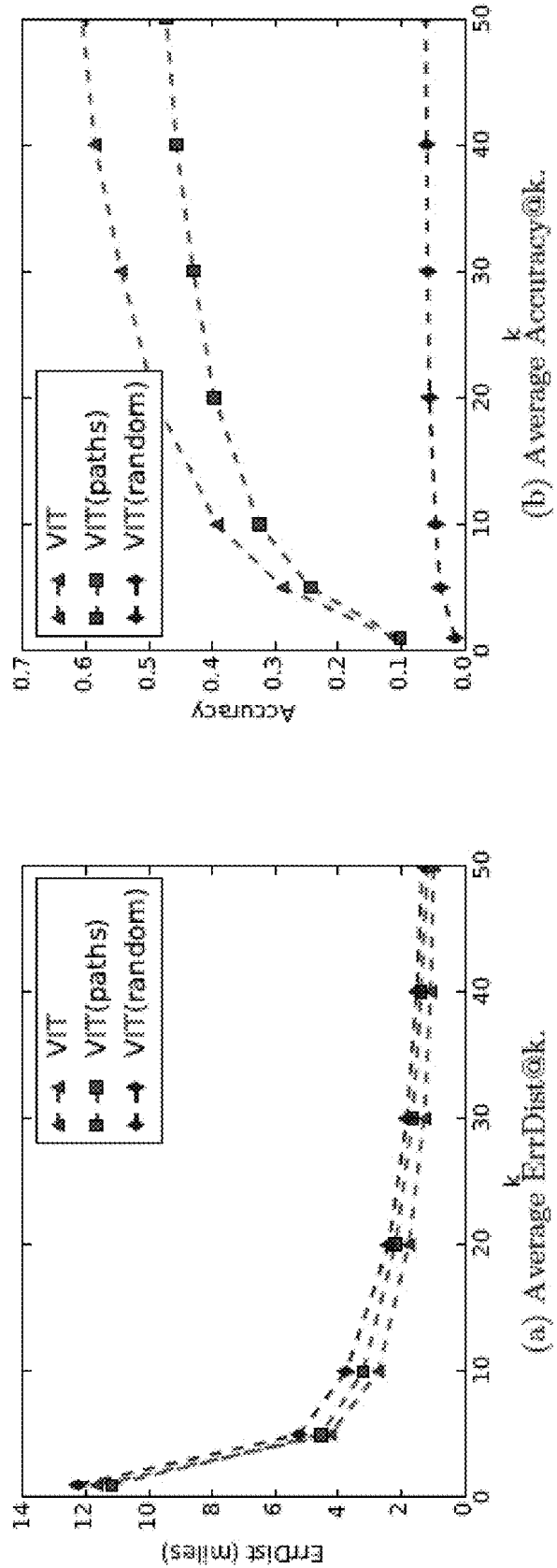
FIG. 13 illustrates performance on using different strategies to enumerate over 19,000 venues in the San Francisco Bay Area in accordance with some implementations.

Predicting which store a tweet was posted at is also of interest, such as from multiple geographic venues of chain stores (e.g., Starbucks, McDonald's, Apple Stores, as shown in FIG. 12). It is still a challenging problem, considering the close proximity of different venues located in a shopping mall, and similar topics shared by tweets at different Starbucks stores. In these cases, however, methods and systems according to implementations of the present disclosure are still efficient, because the number of candidate venues is limited.

First, three strategies are investigated to enumerate geographic venues for a tweet:
Venue Inference for Tweets (VIT) enumerates all the candidate venues;
VIT(paths) only enumerates the venues connected to the tweet through meta-paths as defined in FIG. 8;
VIT(random) randomly samples the same number of venues as VIT(paths) for each tweet.

FIG. 13(a) indicates that by enumerating all candidate venues, VIT (an experimental system developed by the inventors for inferring venue for tweets) can locate a venue in the top-20 predictions (out of 19,084 candidate venues) within 2 miles around the actual venue; FIG. 13(b) shows that the actual venue is correctly identified in the top-20 predictions by VIT for almost 50% of the tweets. By leveraging the meta-paths in FIG. 8, VIT(paths) achieves comparable results with VIT in ErrDist@k, and can identify the actual venue in the top-20 predictions for 40% of the tweets. The average number of venues to be enumerated for each tweet in VIT(paths) is 1,571 in our dataset, which is an order of magnitude less than VIT. It indicates a trade-off for VIT between accuracy and efficiency. The process of enumerating venues can be facilitated for most tweets, since the actual venue associated with a tweet is usually related to the user's social activities embedded in our constructed network. This can be further validated by VIT(paths) significantly outperforming VIT(random).

Next, a consideration is taken regarding how to predict which venue a tweet was posted at within a confined geographic area, e.g., Stanford Shopping Center. As shown in FIG. 11, there are 65 different venues located in the Stanford Shopping Center, including Starbucks, Apple Store, Macy's, etc. Compared with country-level or city-level location prediction studied in other conventional systems, such fine-grained venue inference in a shopping mall is very challenging, because of the close proximity between different stores.

Figure 14:
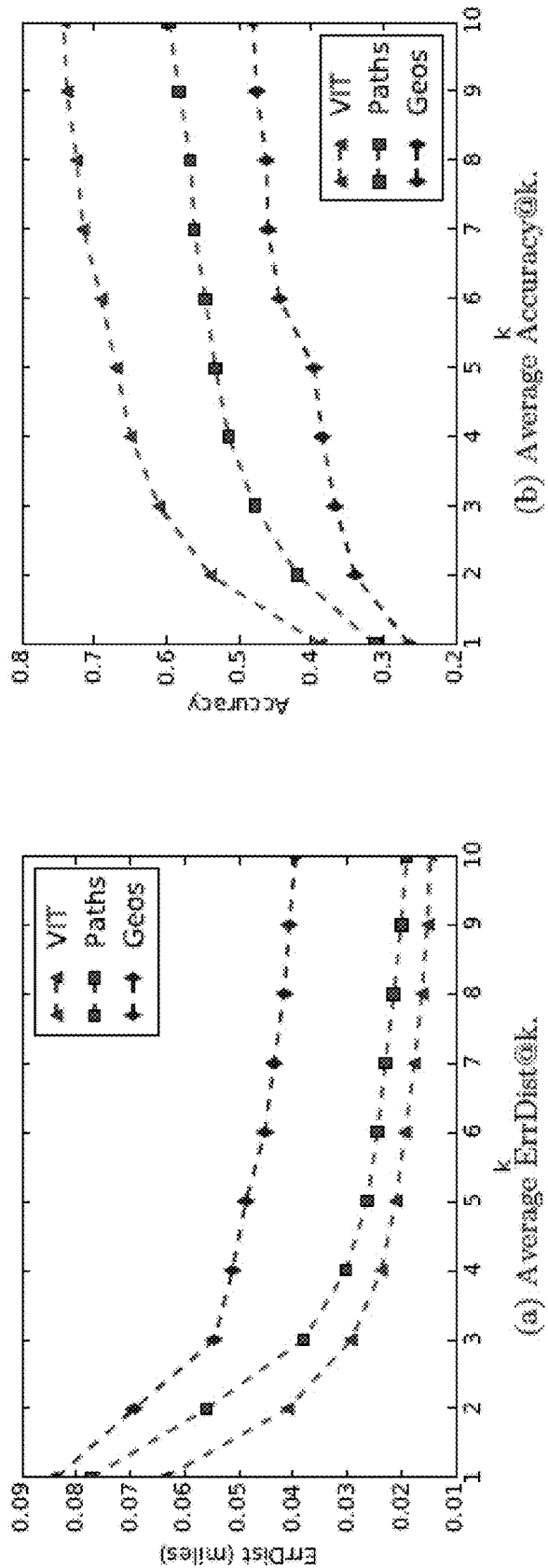
FIG. 14 illustrates performance on inferring geographic venues in the Stanford Shopping Center in accordance with some implementations.

FIG. 14 shows the performance on inferring geographic venues in the Stanford Shopping Center. It is observed that VIT can correctly identify the actual venue in the top-10 predictions for 74% of the tweets in the Stanford Shopping Center. FIG. 14 also includes results when only meta-path based features (PATHS) or features based on geographic data (GEOS) are used. Since venues are inferred within such a small-scale area, GEOS plays a less important role than PATHS in this task. A detailed feature analysis is presented below with respect to the description of FIG. 18.

Identifying the specific store where a tweet was posted at is also of interest, such as from multiple venues of chain stores distributed over the San Francisco Bay Area. Three chain stores are examined: Starbucks, McDonald's, and Apple Stores. As visualized on a Google Map shown in FIG. 12, the numbers of verified venues of Starbucks, McDonald's, and Apple Stores are 409, 184, and 14, respectively, in the data collection area. Inferring the exact branch store where a tweet was posted is important for business analysis of chain stores. For example, predicting a tweet was posted at the Starbucks at Berkeley or the Starbucks at Stanford can facilitate better understanding of user purchasing behavior at different campuses, or deciding on whether to conduct a campus promotion at Berkeley and/or Stanford.

Figure 15:
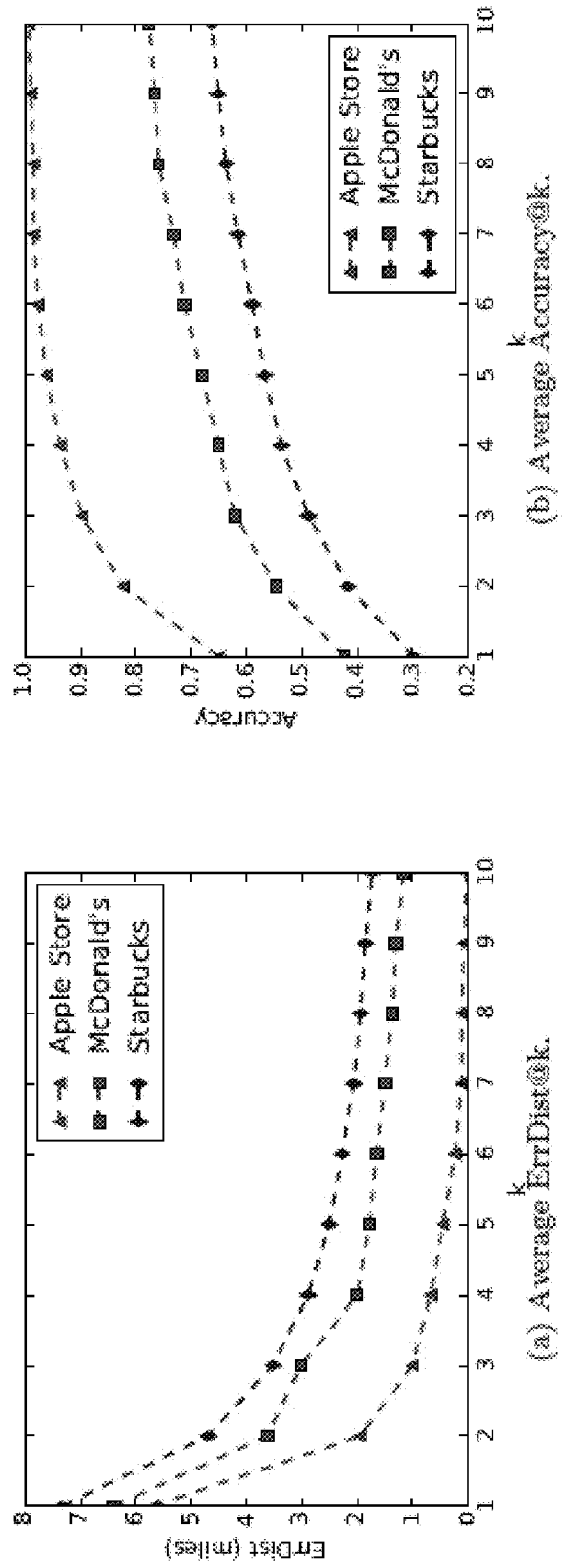
FIG. 15 illustrates performance on inferring geographic venues for tweets associated with Starbucks, McDonald's and Apple Stores in accordance with some implementations.
Figure 17A:
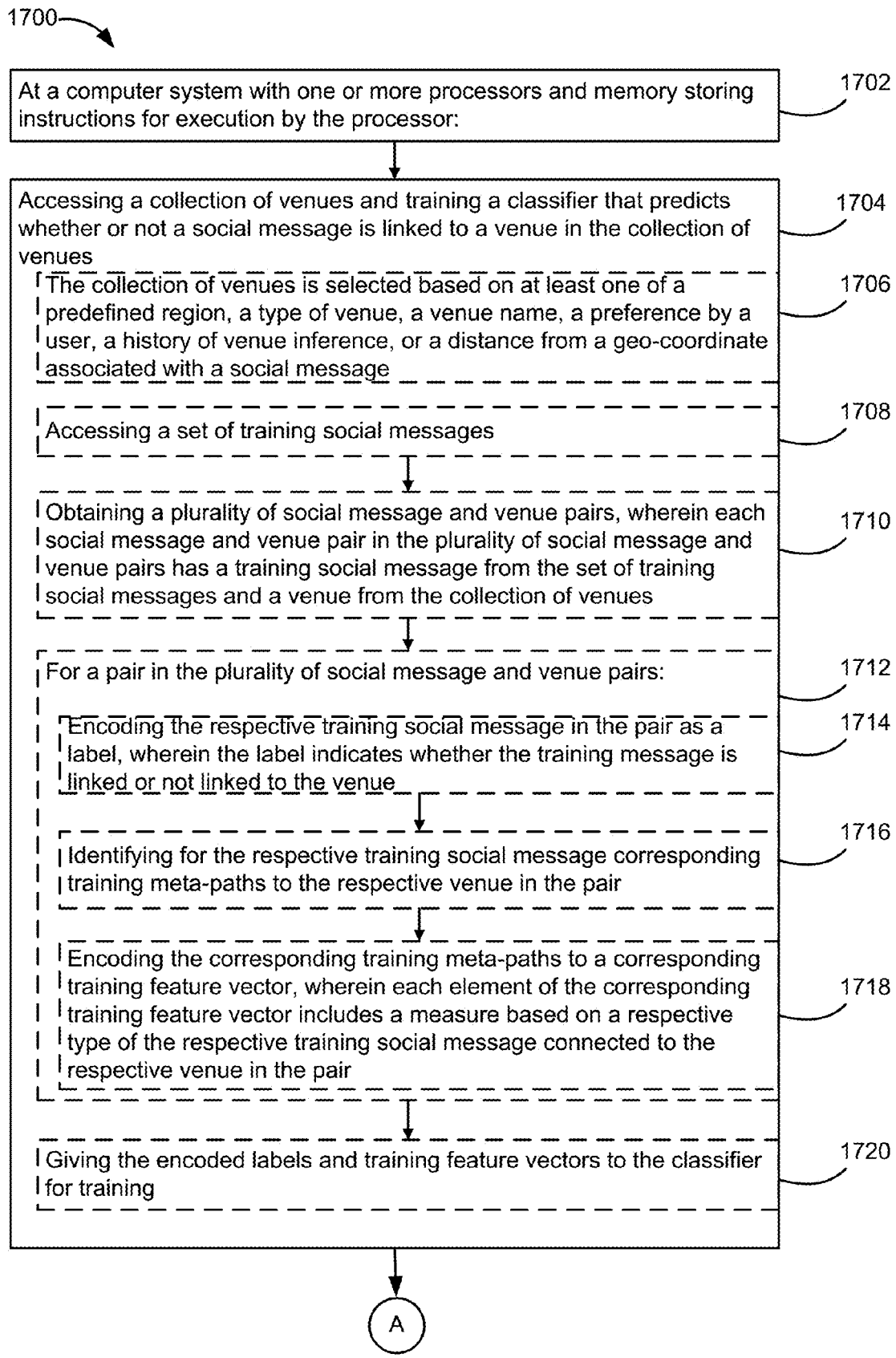
Figure 17B:
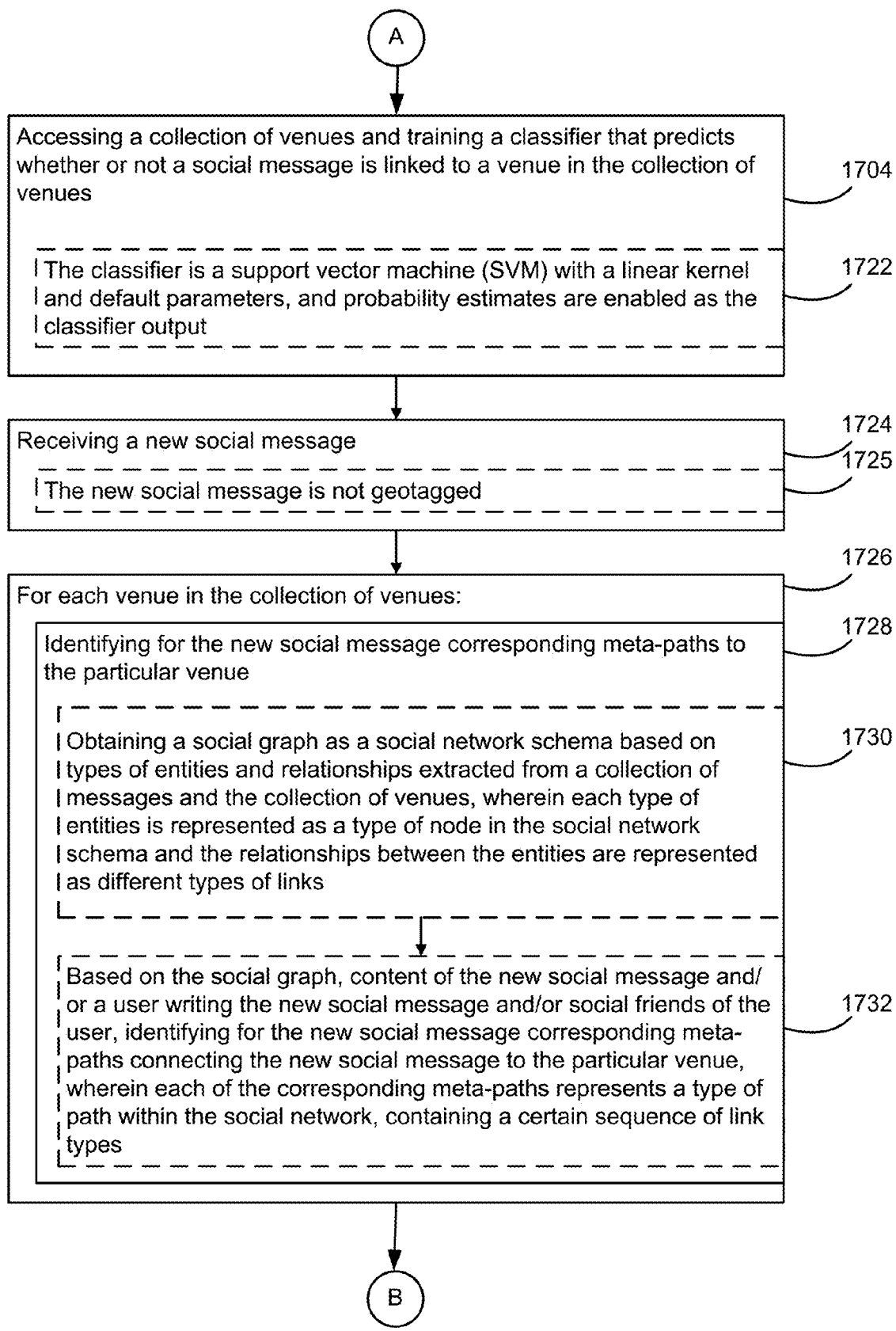
Figure 17C:
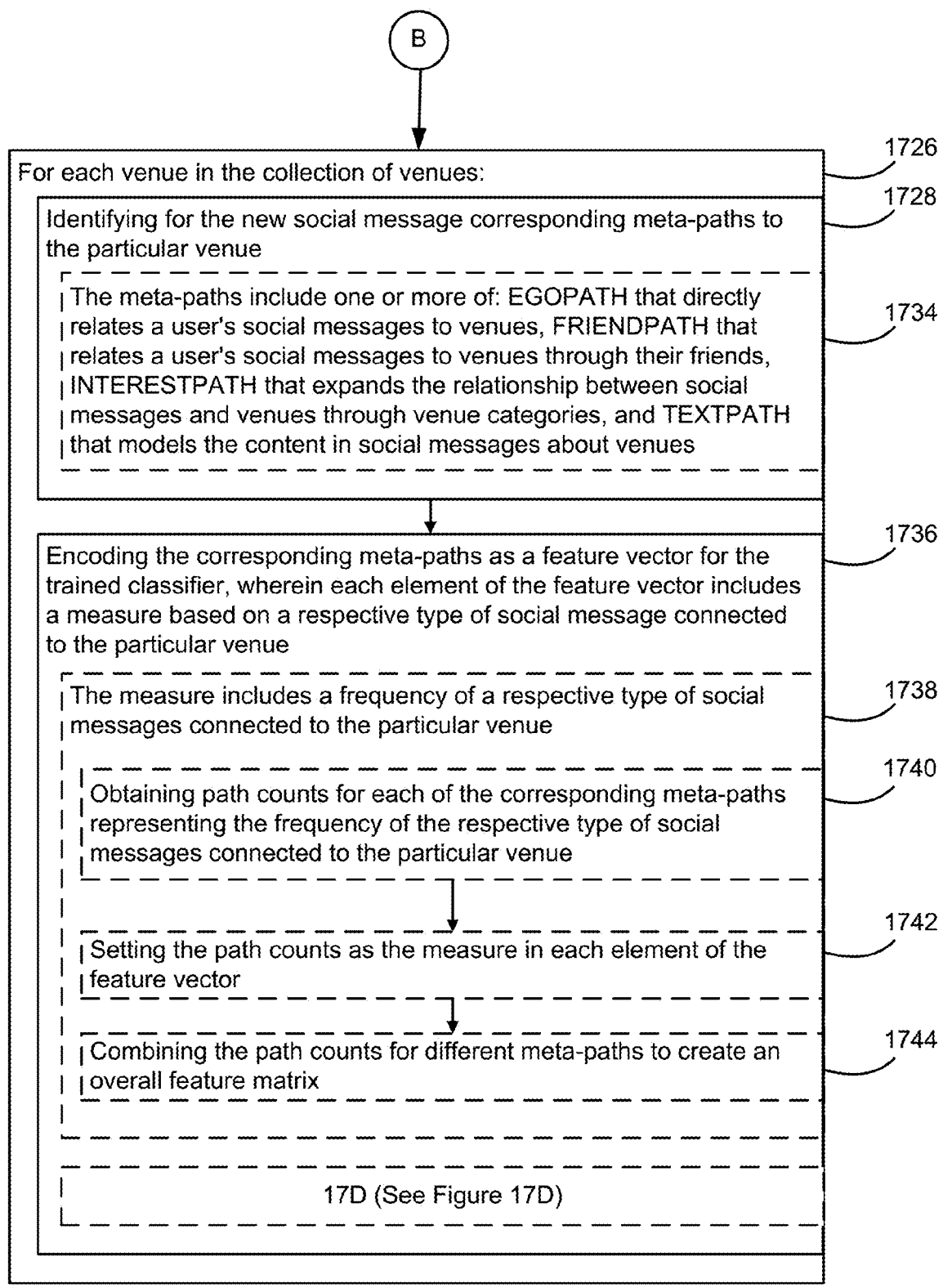
Figure 17E:
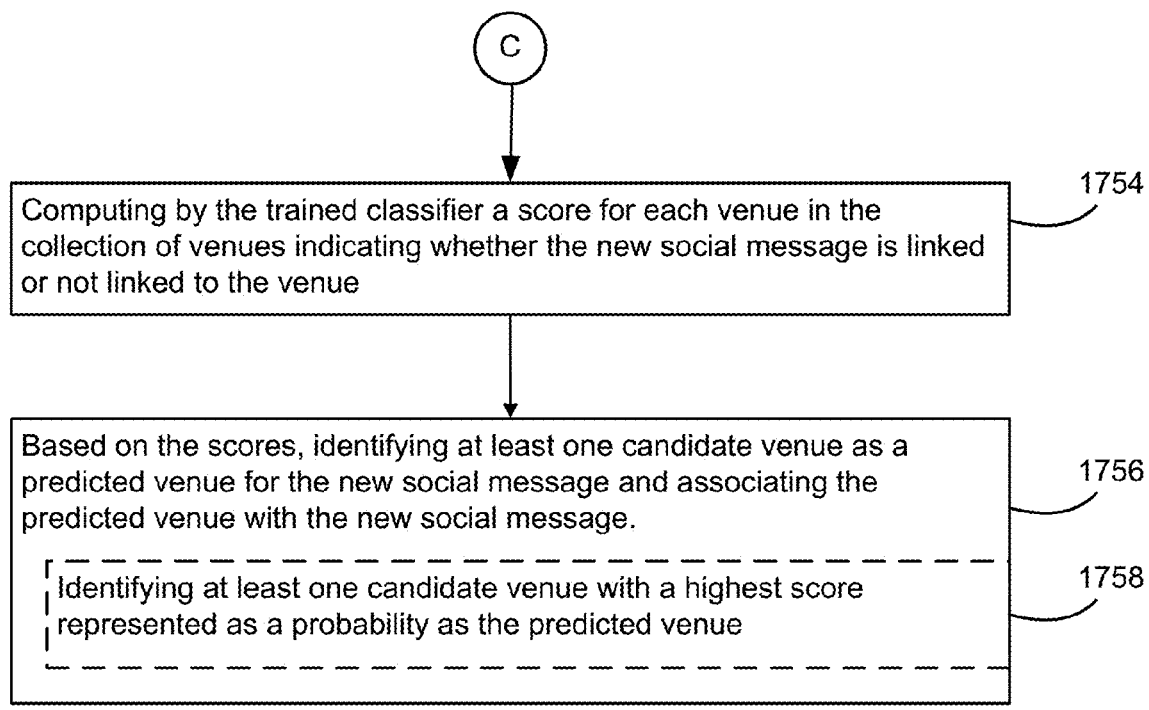

FIG. 15 illustrates the performance of VIT on inferring geographic venues for tweets associated with Starbucks, McDonald's, and Apple Stores. It indicates that VIT can locate a branch store in the top-10 predictions within 2 miles around the actual venue (Accuracy@10), for these three chains. It should be noted that the performance on Apple Stores is the best, because the problem difficulty is positively correlated with the number of candidate venues. Similarly, VIT can correctly identify the actual venue in the top-3 predictions for almost 90% of the tweets about Apple Stores, and the Accuracy@10 for Starbucks and McDonald's is 66% and 78%, respectively.

Additional experiments were conducted to analyze the discriminative power of different features in the setting of link prediction. As described above, a balanced dataset is used for training. Moreover, the same amount of negative links for test data are sampled (i.e., social posts that do not infer a particular venue). Random guessing can therefore be regarded as a naive baseline with 50% accuracy in predicting whether a link exists. Experimental results are shown in FIG. 16, where performance is evaluated by accuracy, precision, recall, and F1-score.

As can be observed in FIG. 16, EGOPATH is useful only when a tweet was posted at a venue which is exactly the same place where the user has other social activities, e.g., check in at, writing a tip about, being a mayor of. As can also be observed in FIG. 16, EGOPATH achieves a very high precision but a very low recall. This is reasonable because the links between tweets and venues would be predicted positive if and only if the corresponding EGOPATH could be found, which can be very sparse in the network. Looking at FRIENDPATH, it achieves a higher recall but a lower precision than EGOPATH. Because by leveraging the social activities of users' friends in Twitter or Foursquare, FRIENDPATH can detect the correlation between tweets and venues in more cases, although such correlation is not as confident as EGOPATH. Overall, FRIENDPATH achieves a better accuracy and F1-score. By taking into account the user interests, INTERESTPATH also achieves comparable performance as EGOPATH and FRIENDPATH. It indicates that users tend to tweet at venues sharing the same category as their social activities. Text is usually an important feature for location inference, as some research found that users implicitly reveal location information in the content of their tweet, with or without realizing it. TEXTPATH is used in our method to encode textual similarity between tweets and venues by matching the common words between tweets and tips related to venues. Surprisingly, by using this single meta-path, 73.67% of the tweet-venue pairs can be accurately classified. Concatenating the four types of meta-path based features, PATHS achieves a significant improvement over any single feature in both accuracy and F1-score. It demonstrates the effectiveness of exploiting the multiple types of meta-paths contained in the constructed heterogeneous information network.

When geographic data is available for some of the user's tweets, EGOGEO can exploit the distance between the user's geotagged tweets and a candidate venue. The good performance of EGOGEO, shown in FIG. 16, indicates that users tend to tweet in the neighborhood of venues where they tweeted before. For those users who are not geo-active (i.e., without any geotagged tweets), methods according to implementations of the present disclosure can still benefit from FRIENDGEO by looking at the geographic information of the users' friends. In agreement with some other research, the results also indicate that each Twitter user can be regarded as a sensor to estimate their friends' locations. By combining these two types of features based on geographic data, GEOS performs quite well on identifying geographic venues for tweets.

FIG. 16 shows that by concatenating PATHS and GEOS, VIT outperforms any single type of features, and can achieve very good performance with accuracy as high as 88.59%. The results demonstrate that for the problem of venue inference for tweets, it is useful to analyze the social relations embedded in our constructed heterogeneous information network and to leverage available geographic data simultaneously.

The approach described herein in accordance with some implementations can be used for inferring the venue and geolocation where a tweet was posted. This has applications in presenting information, recommending services, and targeting advertisements on a hyper-local level. It is shown above that by analyzing the social activities embedded in the constructed heterogeneous information network and leveraging available but limited geographic data, the method can achieve very good performance on the problem of venue inference for tweets.

A potential extension to the disclosed method is to consider temporal information. For example, by exploring the co-location of friends at the time a tweet was posted, the tweet is likely to be associated with the venues of nearby locations of the user's friends. Other extensions include extending the work to larger geographic areas. To improve the efficiency, one approach might be to narrow the regions considered based on the home locations and social activities of the user and their friends, or to iteratively sample the most relevant venues by leveraging the spatial distribution of candidate venues.

FIG. 17 illustrates a flow diagram of a method 1700 for inferring venues from social messages in accordance with some implementations. In some implementations, the method 1700 is performed (1702) at a computer system (e.g., the server 104 in the venue inference system 100) with one or more processors (e.g., the CPU 202) and memory (e.g., the memory 204) storing instructions for execution by the processor (e.g., the CPU 202). In some implementations, the classifier training and the subsequent evaluation of the trained classifier are performed by the classification module 215 on the server 104.

The server 104 accesses (1704) a collection of venues and trains a classifier (e.g., a classifier in the classifiers 238) that predicts whether or not a social message is linked to a venue in the collection of venues. In some implementations, the collection of venues are obtained from external services 122 via communication module 209 and stored in the venue data 230 on the server 104. In some implementations, the collection of venues (e.g., the candidate venues 416) is (1706) are selected based on at least one of a predefined region, a type of venue, a venue name, a preference by a user, a history of venue inference, or a distance from a geo-coordinate associated with a social message. For example, FIG. 5 illustrates a collection of verified venues in the San Francisco Bay area. These verified venues can be used as a collection of venues for training and/or evaluation purpose in accordance with some implementations. In some implementations, smart filters can be applied to use a subset of the verified venues as for training and/or evaluation in test phase. For example, FIG. 11 illustrates venues in a predefined region, such as the Stanford Shopping Center are used for training and/or evaluation, and FIG. 12 illustrates venues qualify for a type of venue and/or a venue name, such as Starbucks, McDonald's, and Apple Stores are used for training and/or evaluation.

In some implementations, the server 104 trains a classifier by first accessing (1708) a set of training social messages (e.g., the postings 402 or a subset of the postings 402). The server 104 then obtains (1710) a plurality of social message and venue pairs, each social message and venue pair in the plurality of social message and venue pairs has a training social message from the set of training social messages and a venue from the collection of venues. In some implementations, the social message and venue pairs used for training are stored in the training data 234 on the server 104. In some implementations, for (1712) a pair in the plurality of social message and venue pairs, the server 104 encodes (1714) the respective training social message in the pair as a label, the label indicates whether the training message is linked or not linked to the venue; identifies (1716) for the respective training social message corresponding training meta-paths to the respective venue in the pair; and encodes (1718) the corresponding training meta-paths to a corresponding training feature vector, wherein each element of the corresponding training feature vector includes a measure based on a respective type of the respective training social message connected to the respective venue in the pair. The server 104 then gives (1720) the encoded label and training feature vectors to the classifier.

In some implementations, the classifier is (1722) a support vector machine (SVM) with a linear kernel and default parameters, and probability estimates are enabled as the classifier output. For example, as shown in FIG. 9, 60 exemplary social message and venue pairs have been obtained for training. In each social message and venue pair, the social message is either linked or not linked to the venue, as encoded by either 1 or 0 respectively in the label vector 920. Each feature vector element includes a measure such as EGOPATH count 902, FRIENDPATH count 904, INTERESTPATH 906, TEXTPATH count 908, EGOGEO score 910, and FRIENDGEO score 912 are computed by the server 104. The feature vector elements can be computed after identifying meta-paths connecting the social message to the venue. In some implementations, as shown in FIG. 7, a social graph can be used as s social network schema in order to obtain the meta-paths. The encoded labels in the label vector 920 and the feature vectors as shown in FIG. 9 are then given to the SVM with a linear kernel, default parameters, and probability estimates enabled as the classifier output.

Once the training phase is completed, the trained model can be used to predict whether a non-geo tagged new social message is linked or not linked to a venue. The server 104 first receives (1724) a new social message from one or more external sources 122. In some implementations, the new social message is (1725) not geotagged. In some implementations, the new social message is obtained from external services 122 via communication module 209 and stored in the social message data 248 on the server 104. For (1726) each venue in the collection of venues, the server 104 preprocesses the new social message in two steps. First, the server identifies (1728) for the new social message corresponding meta-paths to the particular venue. Second, the server encodes (1736) the corresponding meta-paths as a feature vector for the trained classifier, each element of the feature vector includes a measure based on a respective type of social message connected to the particular venue. The feature vector is then given to the trained classifier so that the trained classifier computes (1754) a score for each venue in the collection of venues indicating whether the new social message is linked or not linked to the venue. Based on the scores, the server 104 identifies (1756) at least one candidate venue as a predicted venue for the new social message and associating the predicted venue with the new social message. In some implementations, the server 104 identifies (1758) at least one candidate venue with a highest score represented as a probability as the predicted venue.

In some implementations, the server 104 identifies (1728) for the new social message corresponding meta-paths to the particular venue by obtaining (1730) a social graph as a social network schema based on types of entities and relationships extracted from a collection of messages and the collection of venues, wherein each type of entities is represented as a type of node in the social network schema and the relationships between the entities are represented as different types of link. The server 104 then based on the social graph, content of the new social message and/or a user writing the new social message and/or social friends of the user, identifies (1732) for the new social message corresponding meta-paths connecting the new social message to the particular venue, wherein each of the corresponding meta-paths represents a type of path within the social network, containing a certain sequence of link types.

In some implementations, the measure includes (1738) a frequency of a respective type of social messages connected to the particular venue, such as a path count. When the measure is a path count, the server 104 obtains (1740) path counts for each of the corresponding meta-paths representing the frequency of the respective type of social messages connected to the particular venue and sets (1742) the path counts as the measure in each element of the feature vector. In some implementations, to aggregate sparse path counts, the server 104 further sums (1744) the path counts for different venues to create an overall feature matrix.

In some implementations, the meta-paths include (1734) one or more of: EGOPATH that directly relates a user's social messages to venues, FRIENDPATH that relates a user's social messages to venues through their friends, INTERESTPATH that expands the relationship between social messages and venues through venue categories, and TEXTPATH that models the content in social messages about venues.

In some implementations, the measure is (1746) an ego-geo score that measures a closest distance between geotagged social messages of a user who posted a non-geotagged message and the respective venue.

In some implementations, the measure is (1748) an ego-geo score calculated by $EGOGEO(t_i,v_p)=-\log(\min_{t_j \in T_i-t_i}\|t_j-v_p\|_1+\epsilon)$, Ti denotes the set of geotagged social messages posted by d(., .) denotes the distance between a geotagged social message and a venue, and c is added to avoid underflow with default value $10^{-9}$.

In some implementations, the measure is (1750) a friend-geo score that measures a closest distance between geotagged social messages of friends of a user who posted the new social message and the respective venue.

In some implementations, the measure is (1752) a friend-geo score calculated by $FRIENDGEO(t_i,v_p)=-\log(\min_{t_j \in T_k, u_k \in N_i}\|t_j-v_p\|_1+\epsilon)$.

For example, as shown in FIG. 10, a new social message X is encoded for each venue in the collection of venues Candidate 1, Candidate 2, . . . Candidate N−1, and Candidate N. Using the social graph shown in FIG. 7 as a social network schema, based on the content of the new social message X and/or a user writing the new social message X and/or social friends of the user, corresponding meta-path as shown in FIG. 8 can be identified. The meta-paths are then encoded to compute measures such as EGOPATH count 1010, FRIENDPATH count 1012, INTERESTPATH count

1014, TEXTPATH count 1016, EGOGEO score 1018, and FRIENDGEO score 1020. The encoded meta-path is given to the trained classifier 1022, such as a trained SVM as a feature vector. The trained SVM can have probability estimates enabled as the classifier output. The output of the trained classifier can be ranked by probability such as the highest of Candidate N−1 being 98% possible related to the venue and the lowest of Candidate N being 10% possible related to the venue. Based on the ranked probability, in some implementations, the server 104 identifies at least Candidate N−1 as the predicted venue of being linked to the new message X.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference has been made in detail to various implementations, examples of which are illustrated in the accompanying drawings. In the preceding detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for inferring venues from social messages, comprising:
   at a computer system with one or more processors and memory storing instructions for execution by the processor, the memory further including a data storage component:
   accessing a collection of venues stored in the data storage component;
   training a classifier, using a set of training social messages, that predicts whether or not a social message is linked to a venue in the collection of venues;
   receiving a new social message that is not geo-tagged and does not include geographical identification metadata;
   for each venue in the collection of venues:
      identifying, for the new social message, corresponding meta-paths to the particular venue;
      encoding the corresponding meta-paths as a feature vector for the trained classifier, wherein each element of the feature vector includes a measure based on a respective type of social message connected to the particular venue;
      computing, by the trained classifier, a score for each venue in the collection of venues indicating whether the new social message is linked or not linked to the venue; and
   based on the scores, identifying at least one candidate venue as a predicted venue for the new social message; and
   associating the predicted venue with the new social message in the data storage component, thereby providing the computer system with geographic context of the new social message to facilitate subsequent query search or information presentation related to the predicted venue.

2. The method of claim 1, wherein training a classifier that predicts whether or not a social message is linked to a venue in the collection of venues includes:
   accessing the set of training social messages;
   obtaining a plurality of social message and venue pairs, wherein each social message and venue pair in the plurality of social message and venue pairs has a training social message from the set of training social messages and a venue from the collection of venues;
   for a pair in the plurality of social message and venue pairs:
      encoding the respective training social message in the pair as a label, wherein the label indicates whether the training message is linked or not linked to the venue;
      identifying for the respective training social message corresponding training meta-paths to the respective venue in the pair;
      encoding the corresponding training meta-paths to a corresponding training feature vector, wherein each element of the corresponding training feature vector includes a measure based on a respective type of the respective training social message connected to the respective venue in the pair; and
   giving the encoded labels and training feature vectors to the classifier for training.

3. The method of claim 1, wherein identifying for the new social message corresponding meta-paths to the particular venue includes:
obtaining a social graph as a social network schema based on types of entities and relationships extracted from a collection of messages and the collection of venues, wherein each type of entities is represented as a type of node in the social network schema and the relationships between the entities are represented as different types of links; and
based on the social graph, content of the new social message and/or a user writing the new social message and/or social friends of the user, identifying for the new social message corresponding meta-paths connecting the new social message to the particular venue, wherein each of the corresponding meta-paths represents a type of path within the social network, containing a certain sequence of link types.

4. The method of claim 1, wherein the meta-paths include one or more of: EGOPATH that directly relates a user's social messages to venues, FRIENDPATH that relates a user's social messages to venues through their friends, INTERESTPATH that expands the relationship between social messages and venues through venue categories, and TEXTPATH that models the content in social messages about venues.

5. The method of claim 1, wherein the measure includes a frequency of a respective type of social messages connected to the particular venue, and encoding the corresponding meta-paths as a feature vector for the trained classifier includes:
obtaining path counts for each of the corresponding meta-paths representing the frequency of the respective type of social messages connected to the particular venue; and
setting the path counts as the measure in each element of the feature vector.

6. The method of claim 5, further comprising:
combining the path counts for different meta-paths to create an overall feature matrix.

7. The method of claim 1, wherein the measure is an egogeo score for a tweet $t_i$ being posted by user $u_i$ at venue $v_p$ that measures a closest distance between geotagged social messages of a user who posted a non-geotagged message and the respective venue.

8. The method of claim 1, wherein the measure is an egogeo score calculated by $$EGOGEO(t_i, v_p) = -\log\left(\min_{t_j \in T_i - t_i} \|t_j - v_p\|_1 + \epsilon\right),$$

$T_i$ denotes the set of geotagged social messages posted by $u_i$, $d(.,.)$ denotes the distance between a geotagged social message and a venue, and $\epsilon$ is added to avoid underflow with default value $10^{-9}$.

9. The method of claim 1, wherein the measure is a friendgeo score that measures a closest distance between geotagged social messages of friends of a user who posted the new social message and the respective venue.

10. The method of claim 1, wherein the measure is a friendgeo score calculated by $$FRIENDGEO(t_i, v_p) = -\log\left(\min_{t_j \in T_k, u_k \in N_i} \|t_j - v_p\|_1 + \epsilon\right).$$

11. The method of claim 1, wherein the classifier is a support vector machine (SVM) with a linear kernel and default parameters, and probability estimates are enabled as the classifier output.

12. The method of claim 1, wherein based on the scores, identifying at least one candidate venue as a predicted venue includes:
identifying at least one candidate venue with a highest score represented as a probability as the predicted venue.

13. The method of claim 1, wherein the collection of venues is selected based on at least one of a predefined region, a type of venue, a venue name, a preference by a user, a history of venue inference, or a distance from a geo-coordinate associated with a social message.

14. The method of claim 1, wherein the predicted venue and the new social message are paired and used to train the classifier.

15. A first device, comprising:
memory, the memory further including a data storage component;
one or more processors; and
one or more programs stored in the memory and configured for execution by the one or more processors, the one or more programs including instructions for:
accessing a collection of venues;
training a classifier, using a set of training social messages, that predicts whether or not a social message is linked to a venue in the collection of venues;
receiving a new social message that is not geo-tagged and does not include geographical identification metadata;
for each venue in the collection of venues:
identifying for the new social message corresponding meta-paths to the particular venue;
encoding the corresponding meta-paths as a feature vector for the trained classifier, wherein each element of the feature vector includes a measure based on a respective type of social message connected to the particular venue; and
computing by the trained classifier a score for each venue in the collection of venues indicating whether the new social message is linked or not linked to the venue;
based on the scores, identifying at least one candidate venue as a predicted venue for the new social message; and
associating the predicted venue with the new social message in the data storage component, thereby providing the computer system with geographic context of the new social message to facilitate subsequent query search or information presentation related to the predicted venue.

16. The device of claim 15, wherein training a classifier that predicts whether or not a social message is linked to a venue in the collection of venues includes:
accessing the set of training social messages;
obtaining a plurality of social message and venue pairs, wherein each social message and venue pair in the plurality of social message and venue pairs has a training social message from the set of training social messages and a venue from the collection of venues;
for a pair in the plurality of social message and venue pairs:
encoding the respective training social message in the pair as a label, wherein the label indicates whether the training message is linked or not linked to the venue;

identifying for the respective training social message corresponding training meta-paths to the respective venue in the pair;

encoding the corresponding training meta-paths to a corresponding training feature vector, wherein each element of the corresponding training feature vector includes a measure based on a respective type of the respective training social message connected to the respective venue in the pair; and giving the encoded labels and training feature vectors to the classifier for training.

17. The device of claim 15, wherein identifying for the new social message corresponding meta-paths to the particular venue includes:

obtaining a social graph as a social network schema based on types of entities and relationships extracted from a collection of messages and the collection of venues, wherein each type of entities is represented as a type of node in the social network schema and the relationships between the entities are represented as different types of links; and based on the social graph, content of the new social message and/or a user writing the new social message and/or social friends of the user, identifying for the new social message corresponding meta-paths connecting the new social message to the particular venue, wherein each of the corresponding meta-paths represents a type of path within the social network, containing a certain sequence of link types.

18. The device of claim 15, wherein the meta-paths include one or more of:

EGOPATH that directly relates a user's social messages to venues, FRIENDPATH that relates a user's social messages to venues through their friends, INTERESTPATH that expands the relationship between social messages and venues through venue categories, and TEXTPATH that models the content in social messages about venues.

19. The device of claim 15, wherein the predicted venue and the new social message are paired and used to train the classifier.

20. A non-transitory computer readable storage medium storing one or more programs to be executed by a computer system with memory and one or more processors, the memory further including a data storage component, the one or more programs comprising:

instructions for accessing a collection of venues;

instructions for training a classifier, using a set of training social messages, that predicts whether or not a social message is linked to a venue in the collection of venues;

instructions for receiving a new social message that is not geotagged;

for each venue in the collection of venues:

instructions for identifying for the new social message corresponding meta-paths to the particular venue;

instructions for encoding the corresponding meta-paths as a feature vector for the trained classifier, wherein each element of the feature vector includes a measure based on a respective type of social message connected to the particular venue; and instructions for computing by the trained classifier a score for each venue in the collection of venues indicating whether the new social message is linked or not linked to the venue;

instructions for based on the scores, identifying at least one candidate venue as a predicted venue for the new social message; and instructions for associating the predicted venue with the new social message in the data storage component, thereby providing the computer system with geographic context of the new social message to facilitate subsequent query search or information presentation related to the predicted venue.

\* \* \* \* \*